(12) United States Patent
Li et al.

(10) Patent No.: US 11,650,849 B2
(45) Date of Patent: May 16, 2023

(54) EFFICIENT COMPONENT COMMUNICATION THROUGH ACCELERATOR SWITCHING IN DISAGGREGATED DATACENTERS

(71) Applicant: INTERNATIONAL BUSINESS MACHINES CORPORATION, Armonk, NY (US)

(72) Inventors: Min Li, San Jose, CA (US); John A. Bivens, Ossining, NY (US); Ruchi Mahindru, Elmsford, NY (US); Valentina Salapura, Chappaqua, NY (US); Eugen Schenfeld, South Brunswick, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 579 days.

(21) Appl. No.: 16/141,762

(22) Filed: Sep. 25, 2018

(65) Prior Publication Data
US 2020/0097328 A1 Mar. 26, 2020

(51) Int. Cl.
*G06F 9/50* (2006.01)
*G06F 13/16* (2006.01)
*G06F 21/60* (2013.01)

(52) U.S. Cl.
CPC ........ *G06F 9/5011* (2013.01); *G06F 13/1668* (2013.01); *G06F 21/602* (2013.01)

(58) Field of Classification Search
CPC ....... G06F 3/067–0689; G06F 13/4022; G06F 13/1668; G06F 9/50; G06F 9/5011; G06F 9/5016; G06F 9/5027; G06F 9/505; G06F 9/5083; G06F 21/602; H04L 41/08; H04L 41/0813; H04L 41/0816; H04L 41/0896
See application file for complete search history.

(56) References Cited

U.S. PATENT DOCUMENTS

| | | |
|---|---|---|
| 5,909,559 A | 6/1999 | So |
| 7,324,553 B1 | 1/2008 | Varier et al. |
| 7,415,591 B1 | 8/2008 | Todd |
| 8,645,654 B1 | 2/2014 | Bailey et al. |
| 8,680,706 B2 | 3/2014 | Zyren |

(Continued)

OTHER PUBLICATIONS

M. R. Abbasifard, H. Naderi and O. Isfahani Alamdari, "Efficient Indexing for Past and Current Position of Moving Objects on Road Networks," in IEEE Transactions on Intelligent Transportation Systems, vol. 19, No. 9, pp. 2789-2800, Sep. 2018. (Year: 2018).

(Continued)

*Primary Examiner* — Jeremy S Duffield
(74) *Attorney, Agent, or Firm* — Griffiths & Seaton PLLC

(57) ABSTRACT

Embodiments are provided herein for efficient component communication and resource optimization in a disaggregated computing system. A first set of computing elements are used as in line accelerators and a second set of the computing elements are used as block accelerators within the disaggregated computing system. A switching operation is dynamically performed between the first set of computing elements and the second set of computing elements to perform a workload by rewiring one of a plurality of links associated with respective ones of the first set of computing elements and the second set of computing elements.

21 Claims, 20 Drawing Sheets

(56) References Cited

U.S. PATENT DOCUMENTS

| | | |
|---|---|---|
| 8,819,092 B2 | 8/2014 | Ludwig et al. |
| 8,953,432 B2 | 2/2015 | Ansari et al. |
| 9,100,266 B2 | 8/2015 | Ansari et al. |
| 9,201,837 B2 | 12/2015 | Egi et al. |
| 9,491,112 B1 | 11/2016 | Patel et al. |
| 9,743,160 B2 | 8/2017 | Cao et al. |
| 9,921,972 B2 | 3/2018 | Wilkerson et al. |
| 9,967,319 B2 | 5/2018 | Savelieva et al. |
| 10,008,278 B1 | 6/2018 | Shur et al. |
| 10,069,749 B1 | 9/2018 | Narkier et al. |
| 10,277,525 B2 | 4/2019 | Narkier et al. |
| 10,325,343 B1 | 6/2019 | Zhao et al. |
| 10,394,477 B2 | 8/2019 | Li et al. |
| 10,671,557 B2 | 6/2020 | Li et al. |
| 2002/0191247 A1 | 12/2002 | Lu et al. |
| 2004/0181476 A1 | 9/2004 | Smith et al. |
| 2004/0258408 A1 | 12/2004 | Ramaswami et al. |
| 2005/0033749 A1 | 2/2005 | M'Zoughi et al. |
| 2006/0092976 A1 | 5/2006 | Lakshman et al. |
| 2008/0304519 A1 | 12/2008 | Koenen et al. |
| 2009/0148116 A1 | 6/2009 | Yanagimachi et al. |
| 2011/0145545 A1 | 6/2011 | Hunter et al. |
| 2011/0176804 A1* | 7/2011 | Blinkert ............... G02B 6/356 370/255 |
| 2012/0030676 A1 | 2/2012 | Smith et al. |
| 2012/0272038 A1 | 10/2012 | Wei et al. |
| 2013/0205053 A1 | 8/2013 | Harriman et al. |
| 2013/0275706 A1 | 10/2013 | Schenfeld et al. |
| 2013/0326032 A1 | 12/2013 | Duarte et al. |
| 2014/0149775 A1 | 5/2014 | Ware |
| 2014/0173232 A1 | 6/2014 | Reohr et al. |
| 2014/0244983 A1 | 8/2014 | Mcdonald et al. |
| 2014/0280687 A1 | 9/2014 | Egi et al. |
| 2015/0026380 A1 | 1/2015 | Egi et al. |
| 2015/0026432 A1 | 1/2015 | Borkenhagen et al. |
| 2015/0261466 A1 | 9/2015 | Gu et al. |
| 2015/0381426 A1 | 12/2015 | Roese et al. |
| 2015/0381729 A1 | 12/2015 | Manohar et al. |
| 2016/0055119 A1 | 2/2016 | Egi et al. |
| 2016/0179383 A1 | 6/2016 | Krithavis et al. |
| 2016/0179582 A1 | 6/2016 | Skerry et al. |
| 2016/0276008 A1 | 9/2016 | Saida et al. |
| 2016/0299975 A1 | 10/2016 | Acar et al. |
| 2016/0301624 A1 | 10/2016 | Gonzalez et al. |
| 2016/0359683 A1 | 12/2016 | Bartfai-Walcott et al. |
| 2016/0364271 A1* | 12/2016 | Burger ............... G06F 9/505 |
| 2016/0373416 A1* | 12/2016 | Burger ............... H04L 9/3234 |
| 2016/0378545 A1* | 12/2016 | Ho ............... G06F 9/46 718/107 |
| 2017/0054603 A1* | 2/2017 | Kulkarni ............ H04L 41/0893 |
| 2017/0090757 A1 | 3/2017 | Hunt et al. |
| 2017/0105060 A1 | 4/2017 | Oltman et al. |
| 2017/0116156 A1 | 4/2017 | Fong et al. |
| 2017/0124019 A1 | 5/2017 | Coglitore et al. |
| 2017/0255494 A1 | 9/2017 | Bartfai-Walcott et al. |
| 2017/0293447 A1 | 10/2017 | Bivens et al. |
| 2017/0295107 A1 | 10/2017 | Salapura et al. |
| 2017/0295108 A1 | 10/2017 | Mahindru et al. |
| 2017/0310607 A1 | 10/2017 | Ruan et al. |
| 2017/0329519 A1 | 11/2017 | Bivens et al. |
| 2017/0331759 A1 | 11/2017 | Li et al. |
| 2017/0331763 A1 | 11/2017 | Li et al. |
| 2017/0364428 A1 | 12/2017 | Ganesan et al. |
| 2018/0024932 A1 | 1/2018 | Nachimuthu et al. |
| 2018/0024957 A1 | 1/2018 | Nachimuthu et al. |
| 2018/0024964 A1 | 1/2018 | Mao et al. |
| 2018/0026882 A1 | 1/2018 | Gorius et al. |
| 2018/0027312 A1 | 1/2018 | Adileiia et al. |
| 2018/0027686 A1* | 1/2018 | Adiletta ............... G02B 6/3882 361/679.48 |
| 2018/0046513 A1* | 2/2018 | Breakstone ........... G06F 9/5044 |
| 2018/0070157 A1* | 3/2018 | Menard ............... G02B 6/3518 |
| 2018/0109593 A1 | 4/2018 | Bacher et al. |
| 2018/0189188 A1 | 7/2018 | Kumar et al. |
| 2018/0276044 A1 | 9/2018 | Fong et al. |
| 2018/0284993 A1 | 10/2018 | Guim Bernat et al. |
| 2018/0285009 A1 | 10/2018 | Guim Bernat et al. |
| 2019/0042474 A1 | 2/2019 | Edirisooriya et al. |
| 2019/0044809 A1 | 2/2019 | Willis et al. |
| 2019/0044812 A1* | 2/2019 | Loftus ............... H04L 41/0896 |
| 2019/0065121 A1 | 2/2019 | Malina et al. |
| 2019/0065290 A1* | 2/2019 | Custodio ............... G06F 9/545 |
| 2019/0068693 A1* | 2/2019 | Bernat ............... G06F 11/3442 |
| 2019/0069433 A1* | 2/2019 | Balle ............... H04L 43/0876 |
| 2019/0294476 A1 | 9/2019 | Yadhav et al. |
| 2020/0012508 A1 | 1/2020 | Mahloo et al. |
| 2020/0092228 A1* | 3/2020 | Cai ............... H04L 49/201 |
| 2020/0097426 A1 | 3/2020 | Li et al. |
| 2020/0097428 A1 | 3/2020 | Li et al. |

OTHER PUBLICATIONS

P. X. Gao, A. Narayan, S. Karandikar, J. Carreira, S. Han, R. Agarwal, S. Ratnasamy, and S. Shenker, "Network Requirements for Resource Disaggregation," in Proceedings of the 12th USENIX Symposium on Operating Systems Design and Implementation (OSDI '16), Nov. 2016. (Year: 2016).

P. X. Gao, A. Narayan, S. Karandikar, J. Carreira, S. Han, R. Agarwal, S. Ratnasamy, and S. Shenker, "Network Requirements for Resource Disaggregation," in Proceedings of the 12th USENIX Symposium on Operating Systems Design and Implementation (OSOi '16), Nov. 2016. (Year: 2016).

Anonymous, "Workload Optimization through Dynamic Reconfiguration of Compute Nodes," An IP.com Prior Art Database Technical Disclosure, IP.com No. IPCOM000215416D, Feb. 26, 2012 (4 pages).

Abali et al., "Disaggregated and optically interconnected memory: when will it be cost effective?," arXiv:1503.01416v1 [cs.DC], Mar. 3, 2015 (9 pages).

Pages et al., "Optimal VDC Service Provisioning in Optically Interconnected Disaggregated Data Centers," IEEE Communications Letters, vol. 20, No. 7, Jul. 2016 (4 pages).

Yan et al., "FPGA-based Optical Programmable Switch and Interface Card for Disaggregated OPS/OCS Data Centre Networks," 2015 European Conference on Optical Communication (ECOC), 2015 (4 pages).

AT&T, "Toward an Open, Disaggregated Network Operating System," AT&T Intellectual Property, 2017 (17 pages).

K2L, "Using MOST as general purpose communication protocol," K2L Connecting Networks, Nov. 5, 2009 (11 pages).

Anonymous, "Techniques for Zero Touch Provisioning Over Numbered Interfaces," An IP.com Prior Art Database Technical Disclosure, IP.com No. IPCOM000250018D, May 16, 2017 (14 pages).

Anonymous, "Disaggregate compute—CH8-2015-0101 Resubmission," An IP.com Prior Art Database Technical Disclosure, IP.com No. IPCOM000245592D, Mar. 21, 2016 (3 pages).

Anonymous, "Methodology for Isolating Defective Compute Elements from the System Environment," An IP.com Prior Art Database Technical Disclosure, IP.com No. IPCOM000234794D, Feb. 5, 2014 (3 pages).

Simplivity Corporation, "SimpliVity Hyperconverged Infrastructure Technology Overview," 2015 (29 pages).

Mgor Insights & Strategy, "Datacenter Memory and Storage," Apr. 2015 (37 pages).

Anonymous, "Hardware accelerator mobility in virtualized environments," An IP.com Prior Art Database Technical Disclosure, IP.com No. IPCOM000247760D, Oct. 6, 2016 (6 pages).

Anonymous, "Efficient Accelerators for Matrix Multiplication in Machine Learning," An IP.com Prior Art Database Technical Disclosure, IP.com No. IPCOM000243676D, Oct. 9, 2015 (4 pages).

Anonymous, "Zero latency dynamic data stream scheduling in a resource-shared DSP hardware accelerator," An IP.com Prior Art Database Technical Disclosure, IP.com No. IPCOM000237760D, Jul. 9, 2014 (5 pages).

Kumar, "Networking: Functional Elements and Current Practice," KUMAR: Communication Networking—An Analytica Approach, Mar. 8, 2004 (19 pages).

(56) References Cited

OTHER PUBLICATIONS

Anonymous, "Seamless Aggregation Member Line Transitioning to Reduce Power Consumption in Link Aggregation of IEEE802.3AZ Based Links," An IP.com Prior Art Database Technical Disclosure, IP.com No. IPCOM000251429D, Oct. 31, 2017 (14 pages).
Apendix P—List of IBM Related matters.

* cited by examiner

EFFICIENT COMPONENT COMMUNICATION THROUGH ACCELERATOR SWITCHING IN DISAGGREGATED DATACENTERS

CROSS-REFERENCE TO RELATED APPLICATIONS

This Application is related to the following eight Applications having U.S. application Ser. Nos. 16/141,835, 16/141,842, 16/141,851, 16/141,855, 16/141,863, 16/141,870, 16/141,874, and 16/141,878, each filed on even date as the present Application.

BACKGROUND OF THE INVENTION

Field of the Invention

The present invention relates generally to large scale distributed computing, and more particularly, to efficient component communication techniques and optimized resource utilization in disaggregated computing systems.

Description of the Related Art

A popular type of large scale computing is cloud computing, in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Cloud computing may be provided as a service over the Internet, such as in the form of "Infrastructure as a Service" (IaaS), "Platform as a Service" (PaaS), and/or "Software as a Service" (SaaS). IaaS may typically provide physical or virtual computing devices and/or accessories on a fee-for-service basis and onto which clients/users may load and/or install, and manage, platforms, applications, and/or data. PaaS may deliver a computing platform and solution stack as a service, such as, for example, a software development platform, application services, such as team collaboration, web service integration, database integration, and/or developer community facilitation. SaaS may deploy software licensing as an application to customers for use as a service on demand. SaaS software vendors may host the application on their own clouds or download such applications from clouds to cloud clients, disabling the applications after use or after an on-demand contract expires.

The provision of such services allows a user access to as much in the way of computing resources as the user may need without purchasing and/or maintaining the infrastructure, such as hardware and/or software, that would be required to provide the services. For example, a user may instead obtain access via subscription, purchase, and/or otherwise securing access. Thus, cloud computing may be a cost effective way to deliver information technology services. However, cloud computing may also be hindered by issues of resource configuration and allocation aspects, and hence, there is a fundamental need to enhance and improve upon the structures and systems supporting these services.

SUMMARY OF THE INVENTION

Various embodiments for efficient component communication and resource utilization in a disaggregated computing system, by a processor, are provided. In one embodiment, a method comprises (a) using a first set of computing elements as in line accelerators within the disaggregated computing system; (b) using a second set of the computing elements as block accelerators within the disaggregated computing system; and (c) dynamically switching between the first set of computing elements and the second set of computing elements to perform a workload by rewiring one of a plurality of links associated with respective ones of the first set of computing elements and the second set of computing elements.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
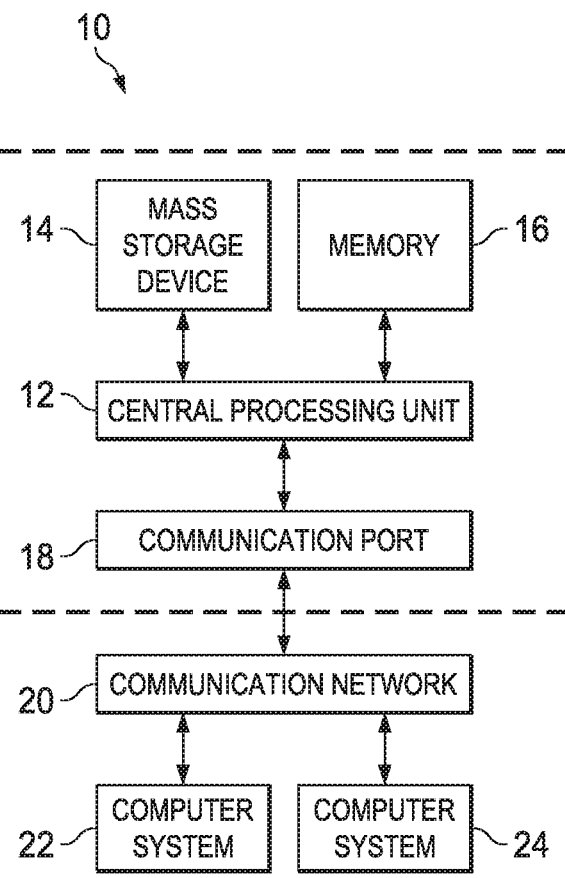
FIG. 1 is a block diagram illustrating a hardware structure of a computing system, according to aspects of the present disclosure.

In any computing environment, and particularly in large-scale distributed models, retrieving data from memory or storage to be processed and then returned for storage is the most fundamental function of the computing system. The manner in which mechanisms are implemented to perform this task, however, vary widely from one another as processing elements are inherently different in their optimization aspects, construction, technology and packaging when compared with that of storage or memory elements and devices. When considering this task, location and latency are key, as the closer the processing elements to the data objects they need to process (and the more efficiently the processing elements are able to access this data), the more optimized the system will be. Optimally, it would be advantageous to avoid copying data over a fabric or network, be that a local area network (LAN) or a symmetric multiprocessor (SMP) type of links between multiple computing elements. Rather, the closest positioning of the processing elements to memory is to create a physical point-to-point, direct link between that memory storing the data and the processing elements. Such connections exist as hardwired (fixed) attachment, for example, between a processor chip to the nearby memory devices (e.g., dual in-line memory modules (DIMMs)) where the processor's memory controller directly drives and manages the memory devices.

In a distributed or parallel processing architecture, however, this former model is not feasible. This is because, for any computation, scientific engineering for high-performance computing (HPC) or business transaction, and/or performance of analytic and cognitive insights, different relationships are created between processing elements and memory elements which are required in the course of the computation. These relationships between multiple different processing and memory elements are inherently more than a fixed hardwired connection can allow access to, which is known as a fundamental problem of the memory wall. To wit, the more processing elements (e.g., processor cores) which are created and need to process data, the more connections to such data is needed, as this data is typically spread over many different memory devices. However the fixed and anything-to-anything connections used in past architectures, cannot scale economically and functionally.

Consider partitioning data into data objects, such that the need to access the information represented by an object while accessing some other data objects, by a common processing element, changes over time. Here, a data object is a collection of information that is required for a computation. This information is viewed as an object because the group of data structures it is representing is being used to compute results by performing computations that may need only the group of data structures being represented, or to be computed properly it may require other such data object groups which were devised to partition the data of the input problem among a large number of memory devices in a particular system (or datacenter). The concurrent computation performed on data objects which are crafted in the latter manner (data stored on multiple devices) usually involve a "network" that transfers data or output from different places in the system, as needed for the computation. Since typically processing elements (e.g., processor devices) have directly attached (in a fixed way) memory devices, there becomes a challenge to partition the overall data the concurrent computations may need to access (and/or change by storing intermediate results) into groups of objects in a manner such that different processing elements (or mixes of different processing elements) have immediate access to in the course of computation.

Accordingly, modern computing architectures do not meet the needs of large scale big data computing requirements, as will be further discussed below. Thus, to create a completely new paradigm for the computation and data distribution/storage issues as aforementioned, a radically new architecture is needed that changes how computation is performed, how the data needed for these computations are accessed from various memory devices, and ultimately how systems and datacenters are organized. Hence, the present disclosure outlines many different and novel techniques for data communication within large scale datacenters and so-called "disaggregated" systems (discussed following). These techniques may use any type of "memory" device, including both intermediate storage (e.g., DIMMs) and devices which may be defined as "storage" at current (e.g., disk and tape drives, flash storage, etc.). Further, these techniques may be applied to any type of processing element device, including accelerators (graphical processing units (GPUs), field-programmable gate arrays (FPGAs), etc.) or regular processors (e.g., central processing units (CPUs)), which may be of any instruction set architecture (ISA) and perform transformations or processing on the information stored by the memory devices. The aforementioned techniques and mechanisms disclosed herein may be generalized into the following categories:

(a) Generic types of memory controllers and computing devices: The communication and rewiring functionality disclosed herein allows the creation of a new system from a different type of architecture at the component level. As will be described, a computing element may implement direct "general purpose links", that connect its package to the rest of the disaggregated computing system. That is, instead of having a fixed partition of connecting bandwidth to memory, SMP, input/output (I/O) and networking communications, as it is performed at present, these novel general purpose links can be used for any type of protocol hardware switched on their physical layer. The use of new technologies such as Silicon Photonics to achieve high bandwidth densities and connectivity allow signals to travel at distances from resources within the same drawer to the furthest resources by traveling across racks, and the whole datacenter if needed. Further, the use of all optical cross connect switches can direct these general purpose links to the right resources, including other processing elements, storage, or memory as needed.

(b) Dynamic memory based communication: The disclosed mechanisms include a platform to allow optimization of data distances depending on the data object's past use or expected use as it relates to memory, Phase Change Memory, Flash and other storage/main memory types of devices. The processing elements access data as a large address space that is segmented with an identifier. While traditional object storage allows a memory-like organization of storage data without the need for a file system and the associated overhead thereof, the techniques used in a disaggregated system perform this functionality more efficiently without the drawbacks of current architectures. Moreover, grouping and amortization through the memory may be used as the main connection to the processing elements, increasing efficiency even further.

(c) Grouping of communications: The discussed techniques use grouping of different, unrelated computing and/or memory type of devices. Shared links may then be used to form a connection by any one of the devices in one group to communicate with any one of the other devices in the other group(s). This grouping will increase the link utilization in cases where the communication needed is using a small fraction of the established link bandwidth between the two (or more) groups. Moreover, the associated relaying of communications may be performed over further distances than group to group at increased efficiency, as the communication will still be faster than using a network/switch based and protocol stack in software.

(d) Utilization of everything: The disclosed functionality provides mechanisms to utilize every resource comprised within the datacenter. While efficiently yet fully utilizing processing and memory type resources is important, the techniques herein focus especially on connectivity bandwidth links that connect between component types to compose disaggregated systems. Since it is extremely important to utilize links associated with any given component wisely so as to maximize the component's output, when a link is established, it is likewise imperative to utilize its link bandwidth to the fullest possible. Hence, disclosed are techniques to aggregate use from multiple resources of the same type to amortize the setup of these connections between resource pools. Thus for certain type of connections, such as in-memory communication (versus using read/write links to/from memory as if it was local to a computing device), the dynamically created connections may be shared between links. Although these links may be shared, they are shared securely through encryption of a common memory location with same pairs of encryption keys (for a same service level agreement (SLA)/user). To wit, multiple links may be shared (for example between components, SLAs, and/or users) yet the data within a given link is secured by using the common memory location which is encrypted. In this way, users/tenants having a particular SLA, for example, may access the link securely just as if it were a dedicated link through use of a particular set of same encryption keys associated and known to the user/tenant or SLA.

(e) In-line accelerators versus block accelerators: The disclosed mechanisms further describe how computing elements may be used as accelerators in two ways. The first way is by connecting a first processing element with another processing element. This may be achieved, for example, through a coherent SMP type of link, in which case, the accelerator shares the main computing element visibility to memory and is to perform efficient acceleration measured by the utilization of the accelerator and the bandwidth of the link connecting it to the other computing element. The second way is for an accelerator to have an independent local memory, copy chunks of information quickly form memory pools at the direction of the main computing element, and then signal and copy back the information to the memory when a computation is finished (as typical GPUs perform currently, for example). In this latter case, the connection is generally formed to a group of accelerators that will share the pool connections to do such data copies form memory pools, and then perform computations on the information from local memory subsequent to the copy. It should be noted, however, that, in performing this way, connections needed are used by multiple accelerators and the communication is relayed through memory pools where the computing elements have been connected previously.

Disaggregated System Description

The techniques of this disclosure preferably are implemented within the context of a "disaggregated" computing system wherein a "disaggregated server"—sometimes referred to herein as a "server entity"—is dynamically constructed/composed or constitutes server resources selected from (or assigned from) shared server resource pools, namely, one or more of: a processor or CPU pool, a memory pool, an accelerator pool (e.g., a GPU accelerator, a network accelerator, etc.), and a storage pool. As the nomenclature suggests, a "compute" pool typically constitutes physical processors (such as CPUs), a "memory" pool typically constitutes physical memory devices (such as DIMMs), etc. A given shared pool preferably includes just the particular resource types, but a particular resource pool may be composed of one or more resource sub-types. The notion of a "pool" is not intended to be limiting, as the common resources may be collected, aggregated or otherwise combined in any suitable manner. Further, a "pool" may be a dedicated set of resources that have the common type or sub-type, or some ad hoc collection of such resources. Preferably, a particular server entity comprises server resources from one or more of the server resource pools.

Disaggregated computing systems provide flexibility and elasticity in constructing bare-metal computing systems for use in the cloud, to provide on-demand flexibility to cloud users, or "tenants". As mentioned, a disaggregated computing system is referred to as a system with large pools of physical hardware resources, such as CPUs, accelerators, memory devices, and storage devices, whose connectivity with each other individual hardware resource can be dynamically switched without shutting down any hardware nor running applications. Individual hardware resources from these pools can be selected to assemble computer systems on-demand. Thus, a bare-metal computer system with a flexible capacity of individual computing resources may be assembled in a disaggregated system, such that workloads are computed based on hardware resource configurations that are most suitable for the respective workload. In one embodiment, for example, a system may be constructed with an extremely high capability of memory size but with a more moderate capacity of CPU and other resources, for a memory-intensive workload. This functionality is enabled by the use of point-to-point circuit wire level switching. In other words, components, on a bare-metal wire level (e.g., using optical memory architecture functionality), are connected in mere milliseconds to assemble a given system or allocate/de-allocate individual components of the given system. All disaggregated system proposals currently known in the art are copy-based systems in which a process state is copied over a memory fabric to local memory at the computation hardware because of the latency in connecting directly to the pool over the memory fabric or over a symmetric multiprocessing (SMP) system. This means that switching between computing components cannot happen in milliseconds as can the point-to-point circuit wire level switching mechanisms used in the present invention thereby enabling a continuous, instantaneous execution of processes even while the computing components are switched.

One advantageous component of disaggregated computing systems is the opportunity to perform computation between various hardware resources in ways previously unattainable. For example, in most pre-configured computing systems, pre-fetching techniques and data locality help to keep cache hit rates high, enabling ultra-fast performance for the end user. However, if the processor spends a vast amount of time finding the needed data in the cache, it may be under-utilizing bandwidth to main memory. Since the disaggregated architecture permits additional processing components to be connected to various memory pool modules, a method to better utilize this bandwidth to memory modules is proposed by efficiently connecting to the memory modules from other processing components (during times of low usage) to perform analytic functions which may lead to valuable insights about the data, or its processing. Such memory access will not pass through the usual SMP fabric connecting processors, and hence does not disturb inter-processor communication and coherency when really needed, increasing efficiency further.

In various embodiments, instead of the memory access passing through the SMP fabric connecting resources, this process may be facilitated by the use of optical links. For example, in some embodiments, each of the processors and memory elements (and/or other components of the disaggregated system) share a number of optical external links. These external links are made for optimizing a point-to-point connection within the optical-switching fabric at very high bandwidth. This optimization may be in the physical implementation used, or in the protocol chosen to facilitate such high bandwidth, and preferably it has the ability to support memory switching within one physical link or multiple physical links to look like one high bandwidth physical link made of a few physical links. Because these external links typically are circuit-switched via at least one optical switch that will not be aware of the data or content thereof, these should use a very lightweight communication protocol.

The physical properties of these external links may require the use of multiple optical wavelengths in a WDM (wavelength division multiplexer), which are all coupled into one fiber or one external link, but are separable at both ends. The mirror-based micro electro mechanical system "MEMS" optical circuit switch "OCS" will deflect in the optics domain, the light beams within these external links, regardless of their number of wavelength, protocol, and signaling speed. Preferably, and in the embodiment depicted, these external links are common to all memory blades and processor blades.

In one architecture, at least one optical circuit switch is shared between the optical external links. Also, several independent circuits may be established between the processors and the memory blades sharing the optical circuit switch. These external links are made for optimizing a point-to-point connection at very high bandwidth. This optimization may be in the physical implementation used in the protocol chosen to facilitate such high bandwidth and has the ability to support aggregation of multiple streams within one physical link or multiple physical links to look like one high bandwidth physical link made of a few physical links. Because these external links are circuit switched via an all optical switch that will not be aware of the protocol, data or content thereof, a very light weight communication protocol is used. Furthermore, the physical properties of these external links may require the use of multiple optical wavelengths in a WDM (wavelength division multiplexer), which are all coupled into one fiber or one external link, but are separable at both ends. The mirror-based micro electro mechanical system "MEMS" optical circuit switch "OCS" will deflect, in the optics domain, the light beams within these external links regardless of their number of wavelength, protocol, and signaling speed. These external links are common to all processors, blades, memory, and independent circuits, such that any memory blade/processor blade may pass information on one or all of these external links, either directly or by passing through the interconnected processor blades. In one exemplary embodiment, circuit-switching switches are used. Circuit switching switches do not need to switch frequently, and thus may be much simpler to build, and can use different technologies (e.g., all optical, MEMS mirror based) to dynamically connect between the circuits, memory, and processor blades.

These types of external links and the dynamic switching enable very high throughput (e.g., high bandwidth) connectivity that dynamically changes as needed. As multi-core processing chips require very high bandwidth networks to interconnect the multi-core processing chips to other such physical processing nodes or memory subsystem, the exemplary optically-connected memory architecture plays a vital role in providing a solution that is functionally enabled by the memory switching operations.

In another example, and in the context of the present invention, the architecture of disaggregated computing systems may be leveraged to dynamically construct a server entity of various physical resources according to the physical locality of the data and the underlying resources needed to complete workloads utilizing this data. Consider that typical resource allocation mechanisms would attempt, for a single computer system, to allocate resources that are physically close to one another to reduce system latency. However, depending on a workload's data access patterns executed by this computer system, these allocations (even as they may be physically close together) may have little or no effect on performance and could lead to fragmented and non-optimal results for the larger disaggregated framework (as the actual locality of the underlying data may be different than the locality of the resources performing the workload). Accordingly, considered is a mechanism for continual resource allocation optimization which leverages observed system behavior (e.g., data access patterns) and the unique, resource allocation capabilities of the disaggregated system to dynamically re-align processing resources to data in a way not possible in traditional systems. This re-alignment of system resources will serve to strike a better balance between the overall disaggregated framework utilization and the performance of each dynamic hardware system.

It should be noted that the instant disclosure, for brevity, may frequent the language of "resources", "components", and/or "elements". In an actual implementation of the present invention, the resources, components, or elements termed herein may be comprised of CPUs (or portions of CPUs such as individual processor cores), GPUs, memory, storage devices, network devices, accelerator devices, etc. which are, again, generally pooled together in a shared resource pool fashion. Indeed, any hardware and/or software resources as commonly known in the art are to be construed interchangeably with "resources", "components", "elements", and/or "resource types" as described herein, as one practicing the art would appreciate.

Typically, the shared resource pools are available within the physical confines of a particular datacenter, although this likewise is not a limitation. Thus, the shared resource pools themselves may be shared across physical datacenters. Further, a particular server entity is not required to be composed of resources from each of the server pools.

By way of background, but not by way of limitation, the following describes a representative computer environment in which the techniques of this disclosure (described below) may be practiced.

Turning now to FIG. 1, exemplary architecture 10 of a general computing environment in which the disaggregated compute system of this disclosure may be implemented and/or comprised of is depicted. The computer system 10 (which may also be referred to as "cloud computing node" 10) includes CPU 12, which is connected to communication port 18 and memory device 16. The communication port 18 is in communication with a communication network 20. The communication network 20 and storage network may be configured to be in communication with computer systems (hosts) 24 and 22 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer systems 24 and 22. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

It is further understood in advance that although this disclosure includes a detailed description on cloud computing, following, that implementation of the teachings recited herein are not limited to a cloud computing environment. Rather, embodiments of the present invention are capable of being implemented in conjunction with any other type of computing environment now known or later developed.

As previously eluded to, cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes and storage systems (e.g. storage subsystem 20).

Figure 2:
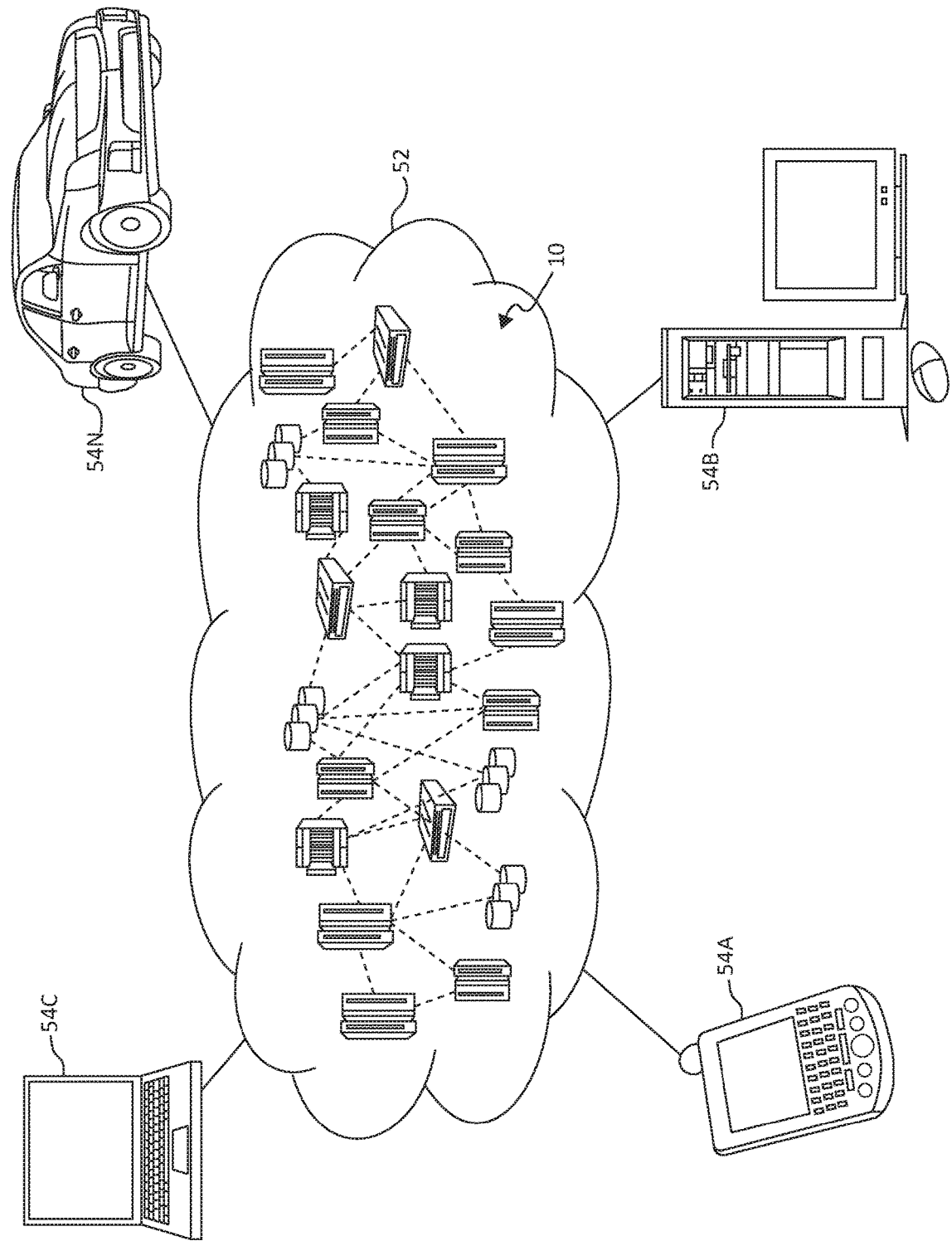
FIG. 2 is a block diagram illustrating an exemplary cloud computing environment, according to aspects of the present disclosure.

Referring now to FIG. 2, illustrative cloud computing environment 52 is depicted. As shown, cloud computing environment 52 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 52 can communicate with any type of computerized device over any type of network and/or network addressable connection (e.g., using a web browser).

Figure 3:
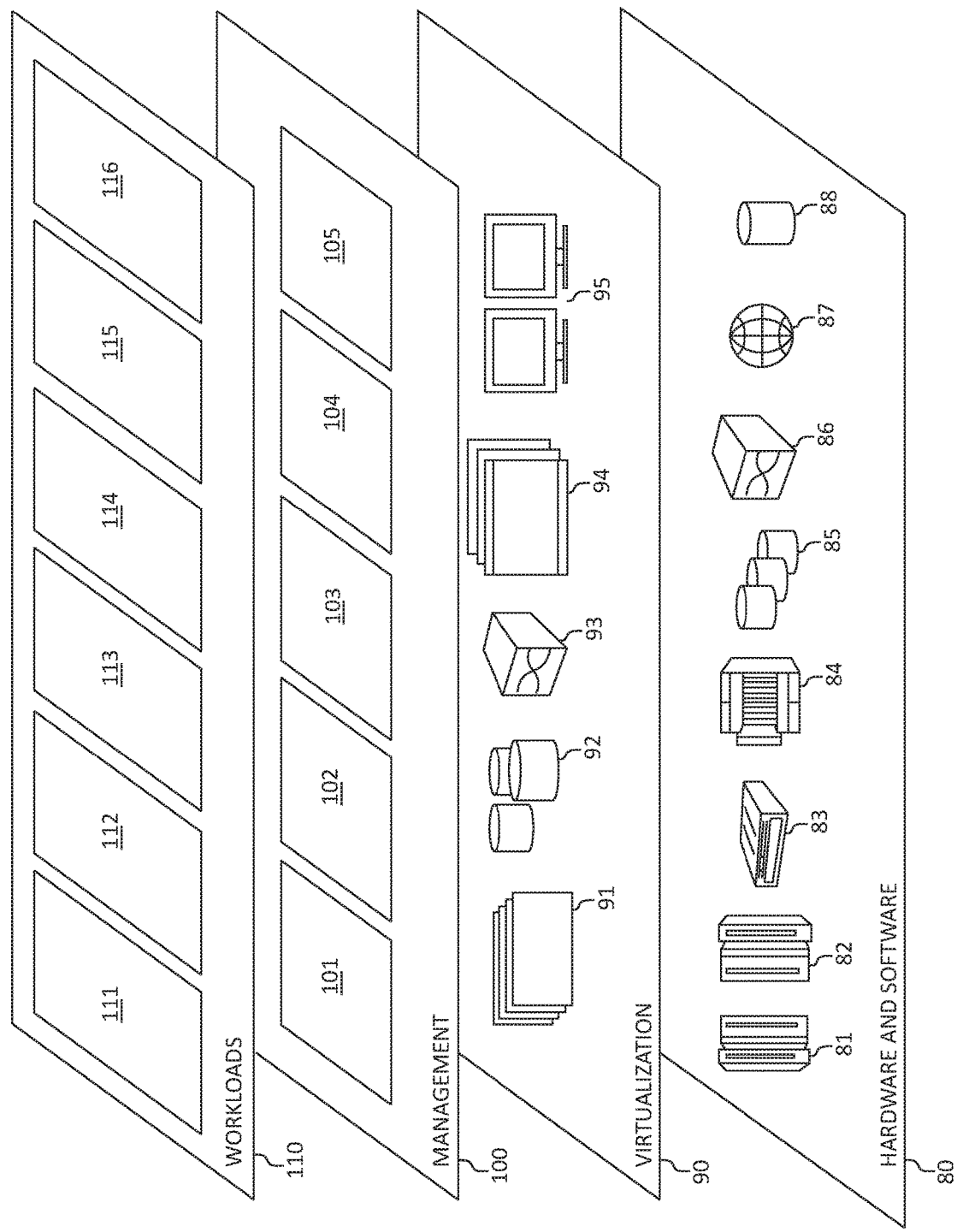
FIG. 3 is a block diagram illustrating abstraction model layers, according to aspects of the present disclosure.

Referring now to FIG. 3, a set of functional abstraction layers provided by cloud computing environment 52 (FIG. 3) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 80 includes hardware and software components. Examples of hardware components include: mainframes 81; RISC (Reduced Instruction Set Computer) architecture based servers 82; servers 83; blade servers 84; storage devices 85; and networks and networking components 86. In some embodiments, software components include network application server software 87 and database software 88.

Virtualization layer 90 provides an abstraction layer from which the following examples of virtual entities may be provided: virtual servers 91; virtual storage 92; virtual networks 93, including virtual private networks; virtual applications and operating systems 94; and virtual clients 95.

In one example, management layer 100 may provide the functions described below. Resource provisioning 101 provides dynamic procurement of computing resources and other resources that are utilized to perform tasks within the cloud computing environment. Metering and Pricing 102 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 103 provides access to the cloud computing environment for consumers and system administrators. Service level management 104 provides cloud computing resource allocation and management such that required service levels are met. Service Level Agreement (SLA) planning and fulfillment 105 provides pre-arrangement for, and procurement of, cloud computing resources for which a future requirement is anticipated in accordance with an SLA.

Workloads layer 110 provides examples of functionality for which the cloud computing environment may be utilized. Examples of workloads and functions which may be provided from this layer include: mapping and navigation 111; software development and lifecycle management 112; virtual classroom education delivery 113; data analytics processing 114; transaction processing 115; and, in the context of the illustrated embodiments of the present invention, various resource monitoring and communication functionality 116. One of ordinary skill in the art will appreciate that the resource monitoring and communication functionality 116 may also work in conjunction with other portions of the various abstractions layers, such as those in hardware and software 80, virtualization 90, management 100, and other workloads 110 (such as data analytics processing 114, for example) to accomplish the various purposes of the illustrated embodiments of the present invention.

Figure 4:
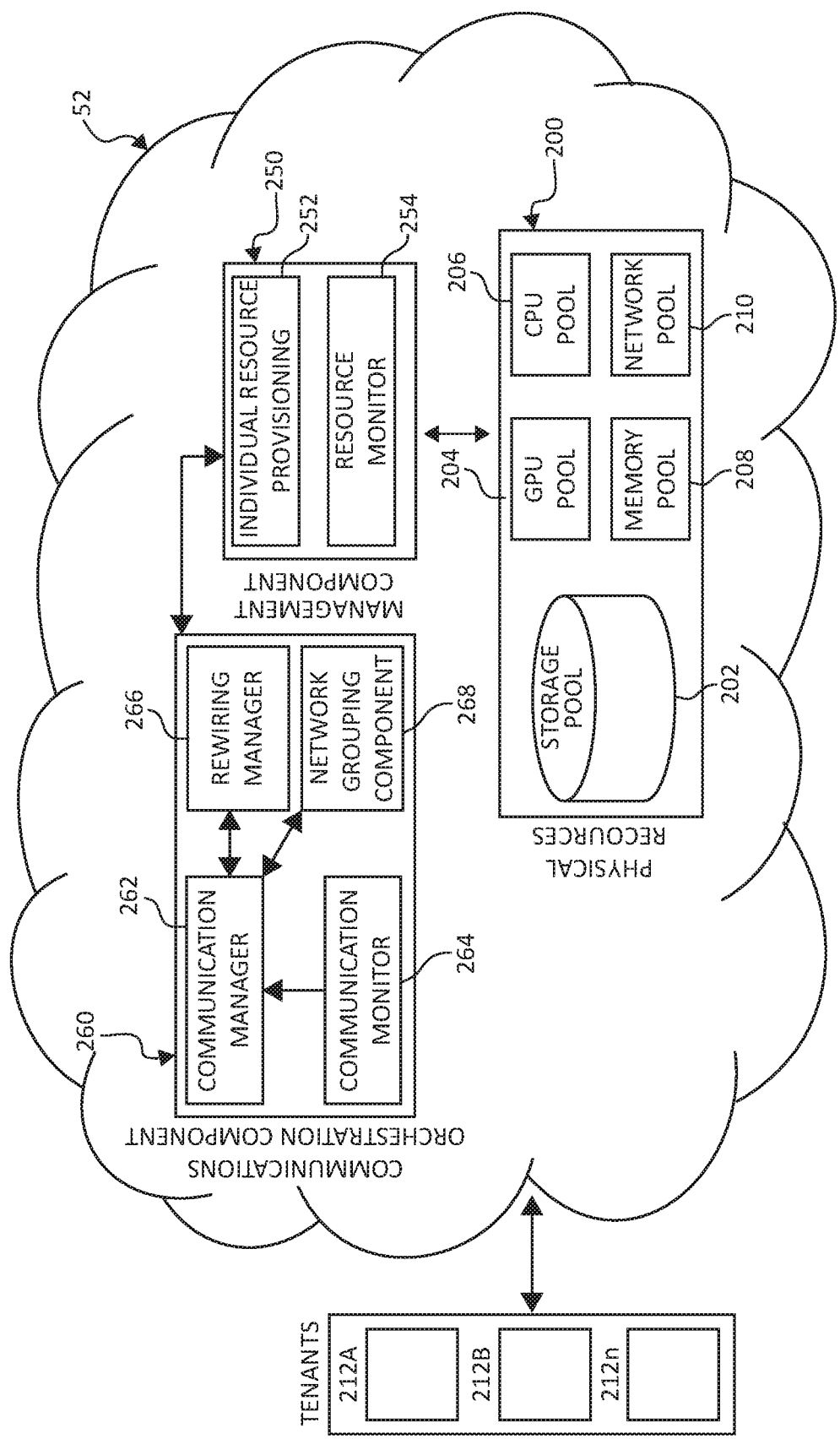
FIG. 4 is a block diagram illustrating a hardware structure of a disaggregated computing environment, according to aspects of the present disclosure.

Turning now to FIG. 4, a block diagram of a disaggregated computing architecture is illustrated, of which is included in the cloud computing environment 52. Within cloud computing environment 52 is the disaggregated computing system comprising physical hardware resources 200. Physical hardware resources 200 may comprise of classifications of the hardware resources such as a storage device pool 202, a GPU device pool 204, a CPU device pool 206, a memory device pool 208, and a network device pool 210. The physical hardware resources 200 are in communication with a management module 250. Management module 250 may comprise of such components as an individual resource provisioning component 252 and a resource monitor 254, each described herein. Further, the management module 250 is in communication with a communications orchestration component 260, which may include components such as a communication manager 262, a communication monitor 264, a rewiring manager 266, and a network grouping component 268. It should be noted that the management module 250 and the communications orchestration component 260 (and associated components therein, respectively) may form one management entity or may comprise separate and distinct entities. In either scenario, the aforementioned component and modules associated with the management module 250 and the communications orchestration component 260 may work in concert to perform various aspects of the present invention which will be described hereinbelow.

In communication with the cloud computing environment 52, the management module 250, and the physical hardware resources 200, are tenants 212A, 212B, and 212n. Tenants 212A, 212B, and 212n may communicate with the cloud computing environment 52 by way of the management module 250, and thus the physical resources 200 provided by any signal-bearing medium.

It should be noted that the elements illustrated in FIG. 4 provide only an example of related components that may be included in the disaggregated computing architecture. For example, management module 250 may include other components than individual resource provisioning component 252 and resource monitor 254, and physical hardware resources 200 may include other component classifications than storage device pool 202, GPU device pool 204, CPU device pool 206, and memory device pool 208, and network pool 210, while staying in spirit and scope of the present invention. Additionally, the duties of the management module 250, and thus the components therein, may be performed and comprised of physical components, computer code, or a combination of such.

In one embodiment, the management module 250 interacts with individual tenants 212A-n to receive workload requests and locate the best suitable hardware resources for the given workload through use of the individual resource provisioning component 252. Individual hardware resources of the physical hardware resources 200 may be tracked by the resource monitor 254 and a mapping be maintained between each respective tenant 212A-n and each respectively assigned hardware resource. Each hardware resource is identified using a unique identifier. This identifier may be a physical identifier (e.g., barcode) and/or a virtual identifier (e.g., code based). The management module 250, or any other suitable modules or means known in the art may be used to accomplish these mechanisms.

In some embodiments, as previously discussed, the communications orchestration component 260 may form one entity with the management module 250 and/or work in concert as a distinct entity to perform various aspects denoted herein. The communication monitor 264, for example, monitors and detects traffic patterns of data transacted between a set of grouped servers and sends information related to these traffic patterns to the communication manager 262. The communication manager 262 may then determine whether to form a more effective network by dynamically reconnecting (rewiring) processors and memories through various links based on the detected communication pattern, as will be further described. When it is determined that a new communication network should be dynamically created, the communication manager 262 may send requests to the network grouping component 268 which determines the most effective processor grouping scheme that may be used to form a dynamic network. Subsequent to the determined processors being partitioned into groups by the network grouping component 268, the rewiring manager 266 may be assigned the task of allocating a shared memory, and processor and memory links which need to be established through the individual resource provisioning component 252 to establish the connection. The rewiring manager 266 may then instruct the management component 250 to execute the rewiring scheme. Finally, the newly established network can be used for the targeted communication to improve the communication efficiency.

Figure 5:
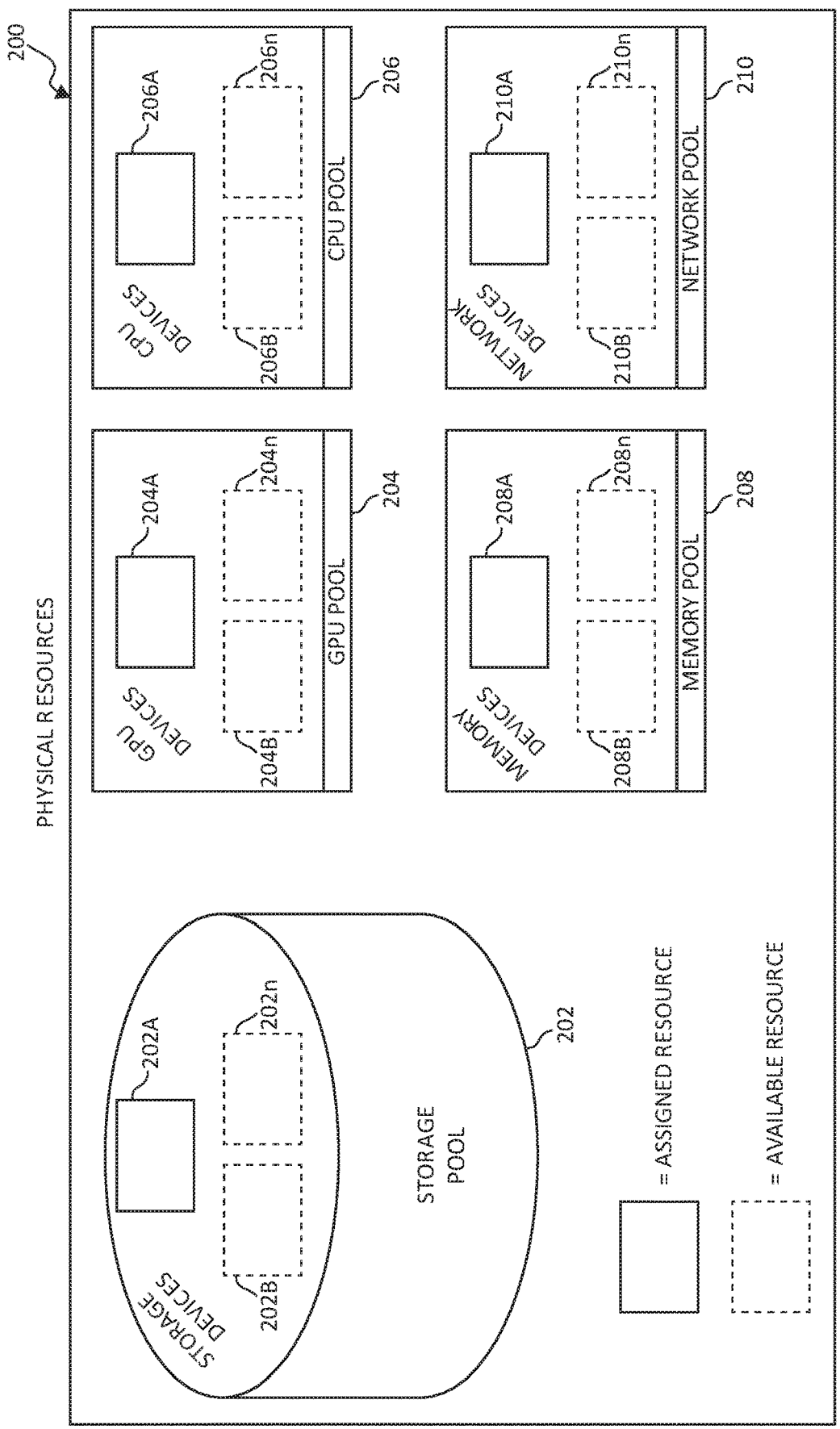
FIG. 5 is an additional block diagram illustrating a hardware structure of a disaggregated computing environment, according to aspects of the present disclosure.

FIG. 5 is a block diagram illustrating the physical hardware resources 200 portion of FIG. 4. Included in the storage device pool 202 are storage devices 202A, 202B, and 202n. The GPU device pool 204 includes GPU devices 204A, 204B, and 204n. The CPU device pool 206 includes CPU devices 206A, 206B, and 206n. The memory device pool 208 includes memory devices 208A, 208B, and 208n. Finally, the network device pool 210 includes network devices 210A, 210B, and 210n. Each aforementioned hardware resource may be in communication with an additional one or more aforementioned hardware resources via a signal-bearing medium.

Within physical hardware resources 200, each hardware resource appearing in solid line (i.e., storage device 202A, GPU device 204A, CPU device 206A, memory device 208A, and network device 210A) are assigned hardware resources to one or more tenants (i.e., tenants 212A, 212B, 212n). Hardware resources appearing in dashed line (i.e., storage devices 202B, 202n, GPU devices 204B, 204n, CPU devices 206B, 206n, memory devices 208B, 208n, and network devices 210B, 210n) are unassigned hardware resources which are available on-demand for a respective tenant 212A-n workload.

Each respective tenant 212A-n may be assigned individual respective hardware resources 200 in arbitrary quantities. In one embodiment, each respective tenant 212A-n may be assigned an arbitrary quantity of an individual respective hardware resource 200 within a limit of total system capacity and/or an available quantity of the respective hardware resources 200. For example, a memory device 208A-n allocated from the memory pool to a respective tenant 212A-n may be provided in a minimal unit of allocation (e.g., a byte or word) up to a limit of total system capacity and/or an available quantity of the memory devices 208A-n.

In another embodiment, each respective tenant 212A-n may be assigned individual respective hardware resources 200 within a quantum step sizing restriction. For example, memory devices 208A-n may need to be allocated on quantum sizes of full or half of memory DIMM units, to assure full bandwidth from the respective memory device 208A-n to the processor when reading/writing data. This is especially true in a disaggregated system since the memory device 208A-n is directly connected via fiber/optical switch to the processor memory unit (for read/write memory transactions) as if it was locally connected to the processor chip, but rather may be a small distance (e.g., 1 meter) away in location. In another example, because the disaggregated system is not based on virtual components but rather physical components (i.e., actual chips than cores or VMs), the quantum sizing restriction may require that a minimum of one CPU device 206A-n be assigned to a tenant 212A-n, with additional CPU devices 206A-n being provisioned to the tenant 212A-n in two, four, etc. quantities.

Dynamic Component Communication in
Disaggregated Datacenters

Having described one or more architectures in which the functionality of the present invention may employ and as previously discussed, in various embodiments, the functionality of the present invention leverages the point-to-point circuit wire level switching and hardware pooling attributes of disaggregated systems to provide an efficient mechanism and architecture for resource communication. As aforementioned, in this type of disaggregated system, like resources are organized into pools which can be directly connected to resources of another pool. An effectively provisioned "system" will be composed of a set of computing resources connected in a point-to-point fashion to memory and storage resources, etc.

By way of background, the paradigm of shared memory or symmetric multiprocessing has created an architecture whereby different computing elements can access data from different memory devices where the data resides, even if the memory elements are not directly connected to the processing elements that need to process the data. This is, as previously described, generally performed through a network or a fabric which is to be directly implemented mostly by hardware circuits or firmware/microcode engines, which facilitate the illusion that all processing elements can share one another's local memory content if needed. Of course, latency to access the data through such a network becomes very high, and as with the usual single computation element, caches are used to bring data closer to the processing elements performing the computation as needed. However, if this data is being used/accessed and changed by more than one processing element, the local cache copies within the processing element need be invalidated such that, when needed, a fresh copy of the data that has changed is read again from the specific memory device on which it is stored.

Figure 6A:
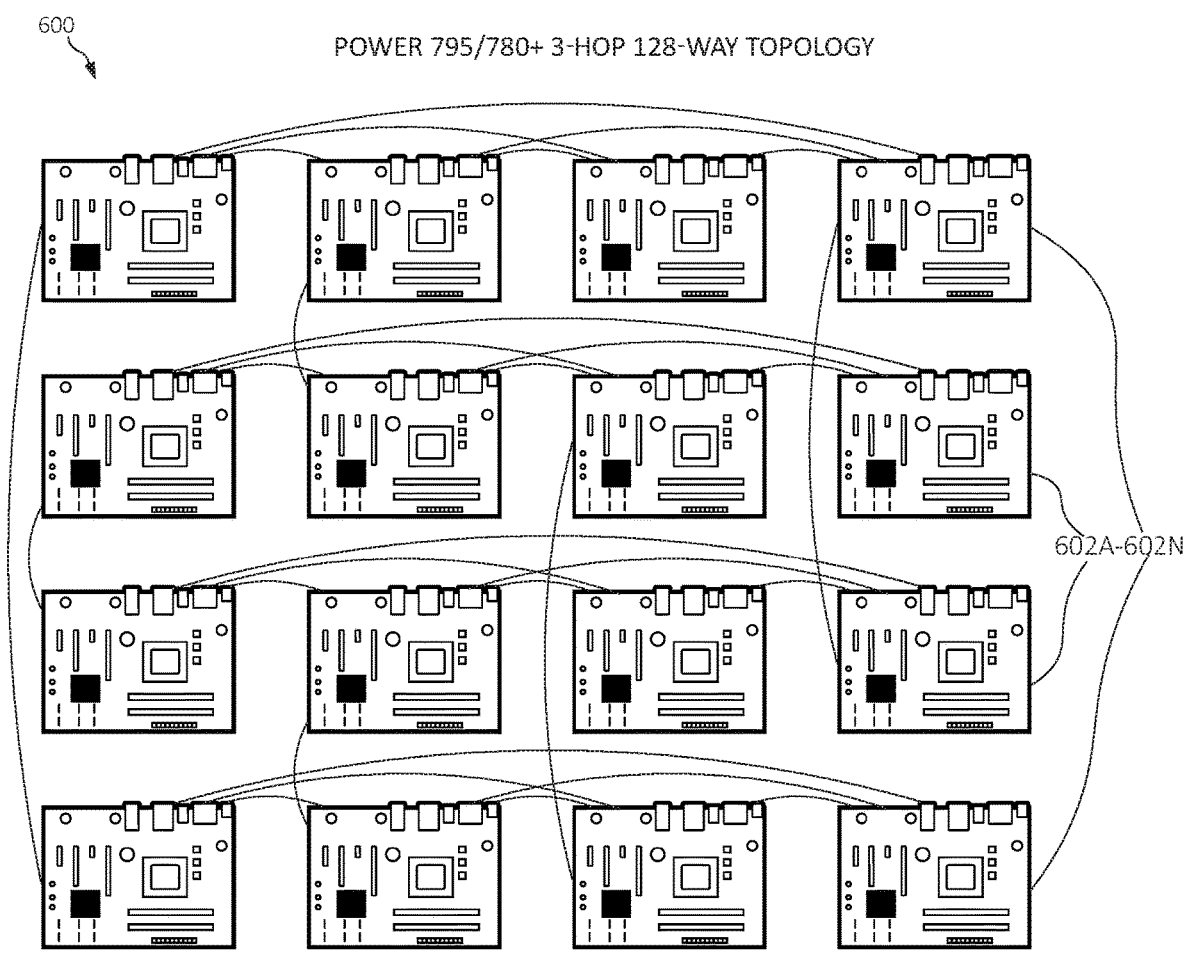
FIGS. 6A-6B are block diagrams illustrating a traditional network and fabric communication architecture, according to aspects of the present disclosure.

Given that the fabric is to allow any-to-any connections, traffic between pairs of memory devices and processing devices can be very high, being limited the through scaling of such an architecture. Hence if processing elements were to only access data that is not directly connected to their processor chips locally, the bandwidth requirements will scale to levels that cannot be economically and practically implemented. For example, in the IBM® Power8 system, the highest-end model comprises 8 memory banks, each capable to handle 200 Gigabits/sec read bandwidth and about 100 Gigabits/sec of write bandwidth. As shown in diagram 600 of FIG. 6A, in a 16-socket Power8 SMP (labeled with processors 602A-n), the total memory bandwidth of the connected processors 602A-n would amount to only a fraction of the sum of the bandwidth which all memory banks of these 32 sockets can use. As technology allows for denser chipsets where more processing elements are created within chips, and with higher density packaging used (such as 3D integration, silicon substrates, etc.), a processor socket is deprived more and more to scale processing power. That is, as technology improves, the connections between the processing elements to other devices (to access data to be computed) do not support the bandwidth sum of all circuit cores and accelerators realized on their own silicon chips.

Figure 6B:
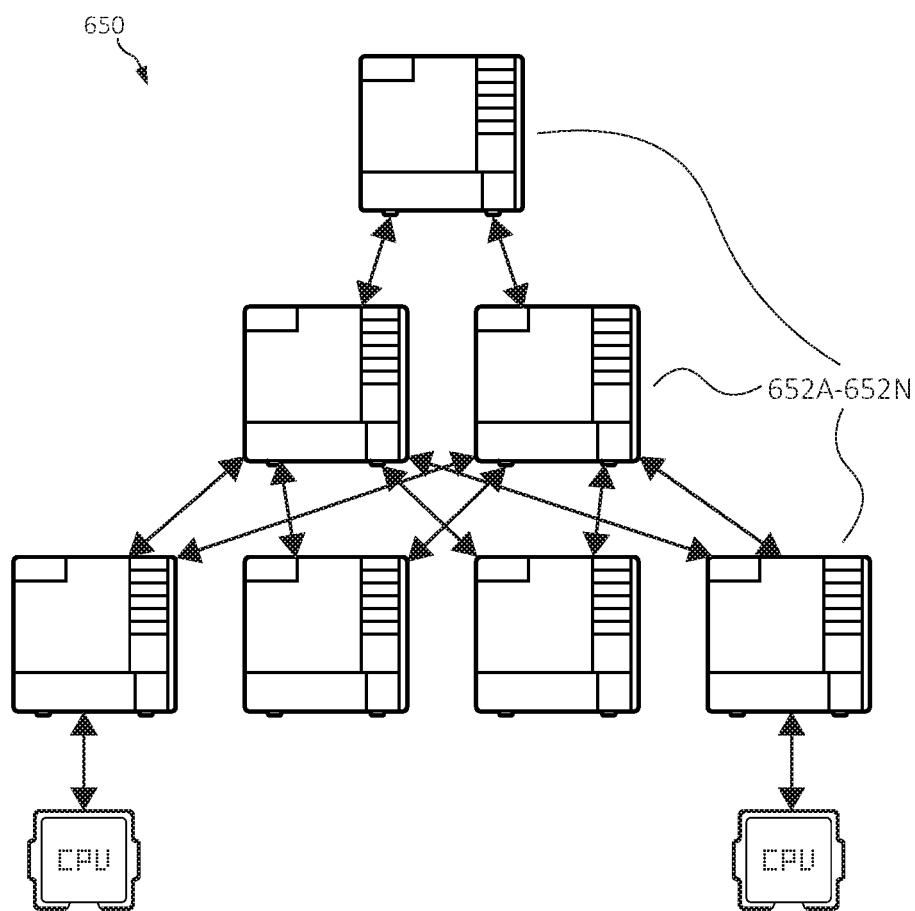

The use of a scale out architecture, illustrated as diagram 650 of FIG. 6B, is even worse than the aforementioned SMP model or scale up cases. In a scale out architecture, multiple servers (referenced as servers 652A-n) are typically connected to a network in a fixed and complex way that may include a software stack used to move data from one server "box" to another. Again, these connections are again fixed so that typically a server is connected to a top of rack (ToR) switch, using Ethernet or Infiniband protocols. A number of ToR switches may further be connected in switching hierarchies (e.g., using a folded Clos topology or equivalent) in a lead/spine type of connection. Therefore, referring to diagram 650, it is inherent that memory holding states (e.g., application states) in one server 652A-n may take a lengthy amount of time to access from computing elements in another server 652A-n, even if both servers 652A-n are connected to the same first-switching ToR hierarchy.

In recent years, a new paradigm has been pushed by various proposals in the industry, some of which are called disaggregated systems. However, in many so-called disaggregated systems, the problem of component communication remains unsolved. While in the ultimate case vision, disaggregated systems comprise resource pools which provide a physical separation between processing devices (which can be any device performing a computation, including accelerators such as GPUs, FPGAs, and specialty accelerators performing artificial intelligence (AI) and deep learning tasks) and memory devices (where "memory" may be different technologies including traditional main memory types to various storage technologies), the problem described above is again unsolved. This is because even in some disaggregated architectures, to access data from any memory device place efficiently by any processing device types the data still passes through a fabric or a network that has the same drawbacks as the aforementioned case of the SMP fabric for scale up architectures. Typically these systems are using fixed local attached memory to processing elements, and the fabric is used to copy chunks of data from memory pools to local fixed attached memory devices which are placed at the processing element's sockets. Hence these architecture do not fully "disaggregate" memory from processing elements and still rely on copying data back and forth. The reason this is problematic has to do with the ability to quickly move resources (e.g., processing elements) from one workload/SLA, for example, to another SLA/user without having to copy back the local memory content thereby freezing the state of the SLA for future use (nor the need to copy a previously suspended state of an SLA from a memory pool to reactivate the state if it is needed quickly). Hence, the agility and elasticity corresponding with real-time events cannot be matched, and the utilization of these resources will not be as high as was the case with previous generations of datacenters and servers.

Generic Types of Memory Controllers and Computing Devices

The disaggregated approach of the present disclosure differs from those architectures previously described by truly "disaggregating" the processing and memory elements by way of facilitating generic communication between all components. That is, the disclosed techniques solve previous deficiencies by uncoupling the need for data to be copied back and forth to processing elements and memory devices, and rather implement a novel communication system which does not need to transfer data information through the traditional SMP fabric. It should be noted that the functionality of the present disclosure can be applied to any type of "memory" device and any type of "computing element", be it digital or analog in nature of the stored data therein or the computation carried out by the computing elements.

Figure 7A:
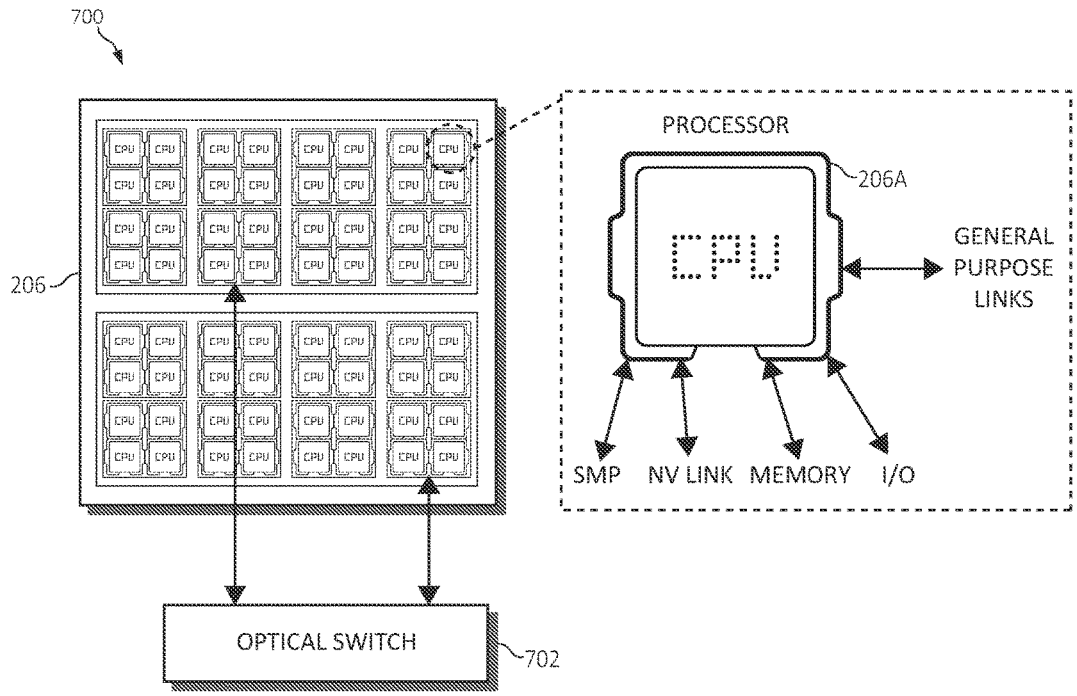
FIGS. 7A-7E are block diagrams illustrating component level building blocks for constructing a dynamically-wired communication architecture, according to aspects of the present disclosure.

First defined are a set of generic types of processing and data store components with various types of links, which will be further described. FIGS. 7A-7E depict what may be described as "building blocks" forming the fundamental base of this communication architecture. Now referring to FIG. 7A, illustrated is a processor building block 700 which contains groups of processors (e.g., selected from the CPU device pool 206 and/or as a "drawer" of processors within a rack) which are connected to one another with SMP links. Each processing or processing element (e.g., depicted processor device 206A) is additionally equipped with a set (of a certain number, depending on the device or element) of "general purpose links" which can be dynamically configured to connect to various types of devices, components, or elements on-demand. These general purpose links may also be referred to as "stem cell links" because of their inherent ability to connect and differentiate between multiple types of links between multiple types of devices (i.e., a general purpose link or "stem cell" link is not fixed in its use case, protocol, or connectivity to a certain type of device, element, or component). For example, the general purpose links can be configured as a graphical processing link of a graphical processing fabric (e.g., an NVLink™) connecting the processing elements to GPU devices. The general purpose links may further comprise memory load store links connecting the processing elements to memory DIMMs, I/O links connecting the processing elements to storage devices, or SMP links connecting the processing elements to other processors. These general purpose links are connected to an optical switch 702 in order to communicate with other components (e.g., the memory, storage, accelerator devices, etc.) outside of the CPU device pool 206 drawer; and processors transferring information with one another within the same pool or drawer communicate through the processor backplane (not depicted). It should be again noted that these general purpose links can be dynamically configured (in substantially real-time) based on the needs of the devices involved and the data communicated, thus the system becomes more flexible and the link utilization can be significantly improved.

Figure 7B:
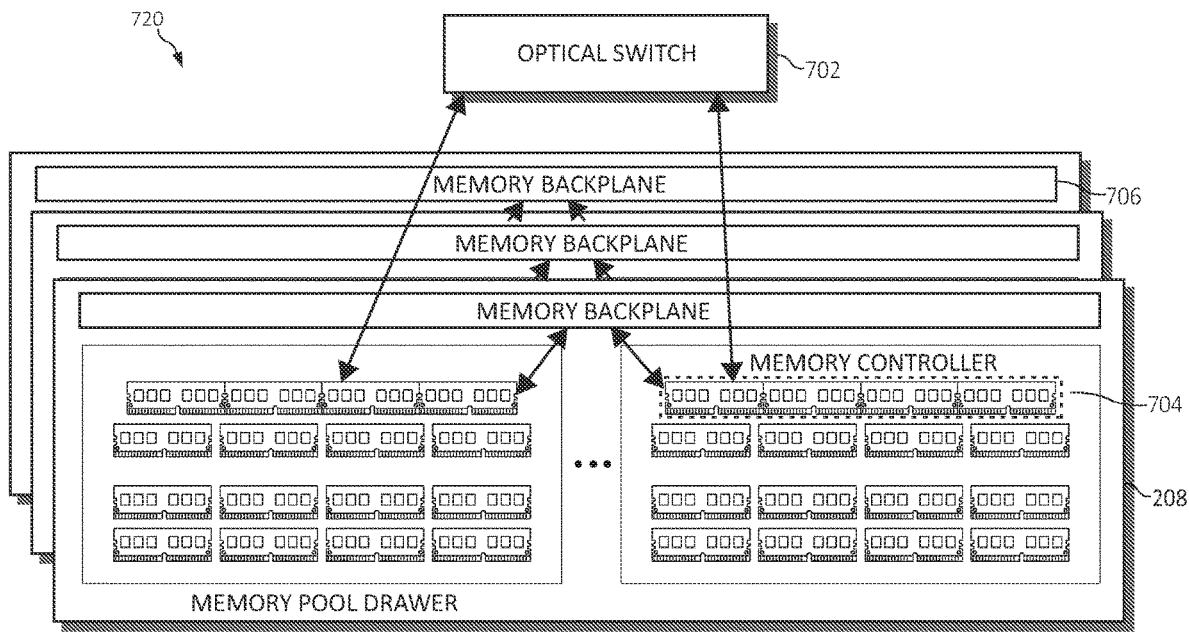

Advancing, FIG. 7B demonstrates the connections of a memory building block 720. Inherently, within the disaggregated architecture there are multiple memory cards within a pool (e.g., memory devices 208A-n depicted in memory pool 208) or drawer. A memory card or device is generally composed of a memory controller and multiple memory DIMMs. The memory DIMMs within the same memory cards communicate through the memory controller 704 controlling the connected cards or devices thereto. DIMMs located on different memory cards communicate through the memory controllers each of the memory DIMMs are attached to. Controllers on different memory cards within the same pool or drawers communicate through the memory backplane 706; and controllers on different memory pools or drawers communicate through the optical switch 702. Accordingly, the links of memory controllers can be dynamically rewired to connect to different processor drawers or different memory drawers based on the communication needs of the allocated applications.

Figure 7C:
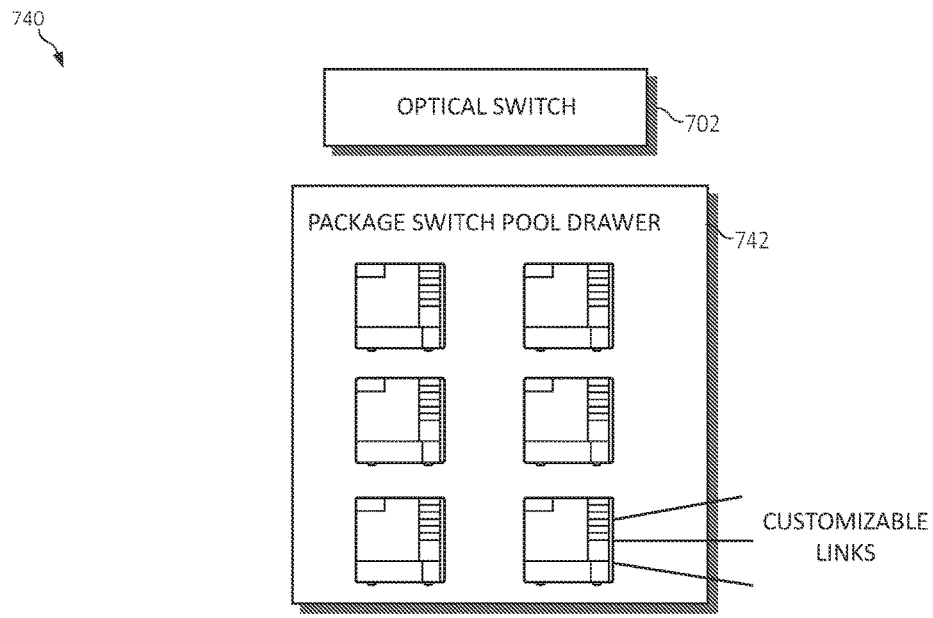

FIG. 7C illustrates a switch building block 740. Unlike the traditional data centers where the switches are statically configured and linked as spine-leaf network architecture (as shown in FIG. 6B), the package switches are instead organized into package switch pool drawers 742. Within each package switch pool drawer 742, each switch has a number of links (general purpose or stem cell links) which can be dynamically reconfigured to connect to different devices, components, or elements (within the same pool/drawer or other pools/drawers) as needed.

Figure 7D:
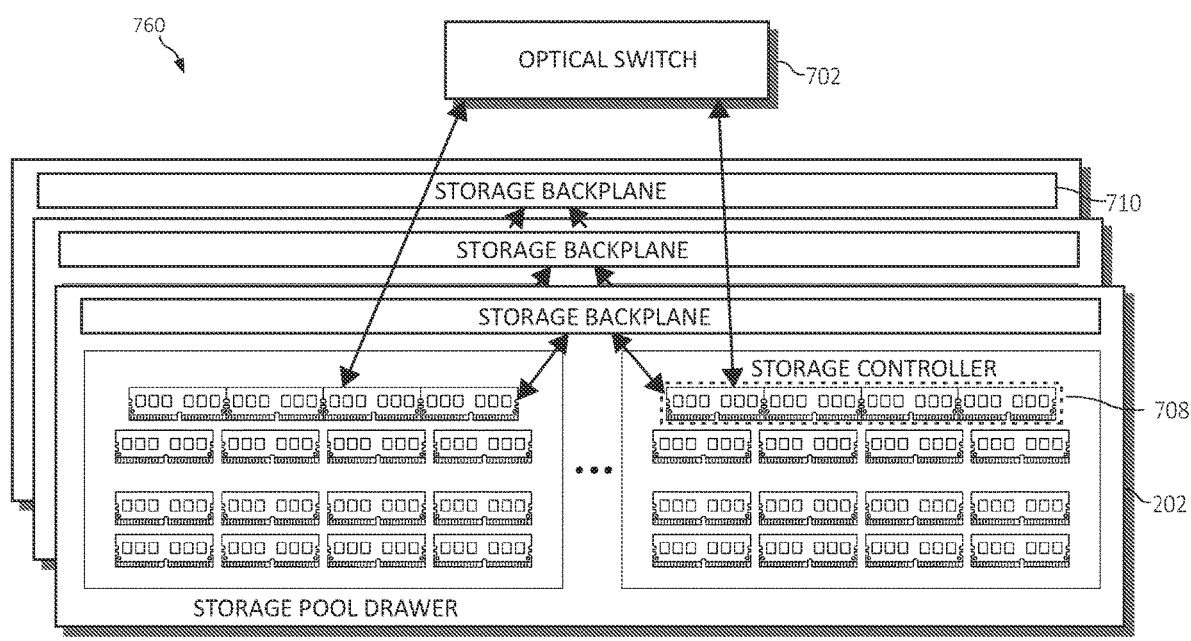

Continuing, storage building blocks have a similar architecture as the memory building blocks 720 illustrated in FIG. 7B. FIG. 7D depicts a storage building block 760 where, similar to the memory controller 704, the storage controller(s) 708 are responsible for managing storage devices (e.g., storage devices 202A-n depicted in storage pool 202) within the storage pool drawer, such as disk drives, NV flash, etc. The storage controller 708 communicates through the storage backplane 710 if the storage devices therein are transacting data within the same drawer. Otherwise, storage controller 708 may communicate through optical switch 702 to other storage controllers (in other pools or drawers), the memory pool 208 drawers, or CPU pool 206 of processor drawers, etc. Again, the communication through the links of the storage controller 708 may be dynamically reconfigured to communicate data to other devices, components, or elements (within the same pool/drawer or other pools/drawers) as needed within the disaggregated system.

Figure 7E:
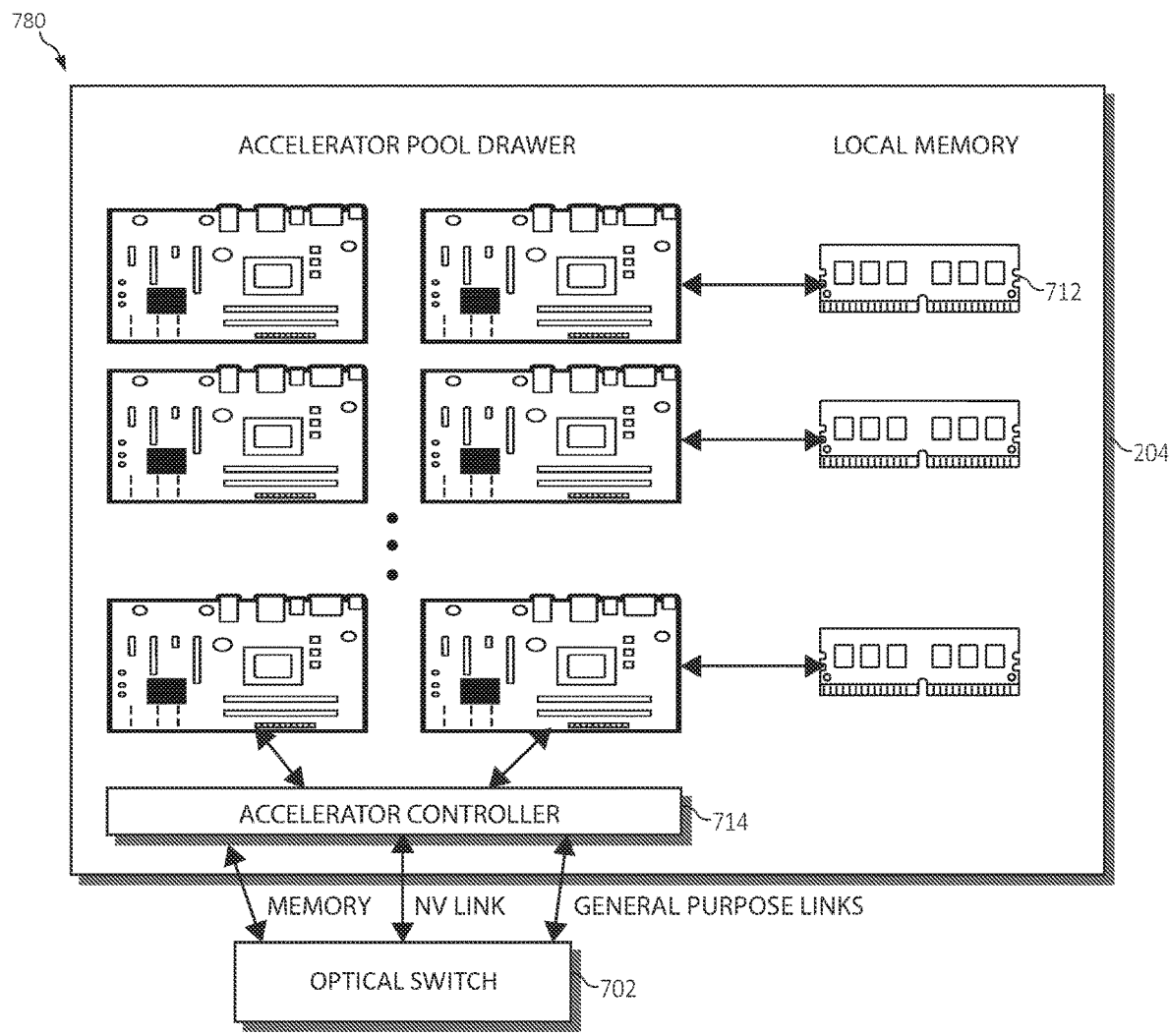

Finally, FIG. 7E illustrates an accelerator building block 780, which contains one or more accelerator controllers 714 and accelerators (e.g., GPU devices 204A-n depicted in GPU pool 204) within the accelerator pool drawer. The accelerators may include local memory 712 attached to speed up the processing efficiency of the respective accelerators within the drawer. Like the previous examples, the accelerator controller 714 may communicate and transact data to other controllers within the same pool or drawer through an accelerator backplane (not depicted), or to other accelerator controllers in different (separate) pools or drawers through the optical switch 702. The general purpose links used by the accelerator controller 714 may be dynamically configured as a memory link, graphical processing fabric link (e.g., an NVLink™), an I/O link, etc. dependent upon which devices the accelerator controller 714 connects to. Similar to those aforementioned other building block examples, these links may be dynamically reconfigured ("rewired") at any time based on the needs of the communication and data required thereof.

Dynamic Memory-Based Communication

Figure 8A:
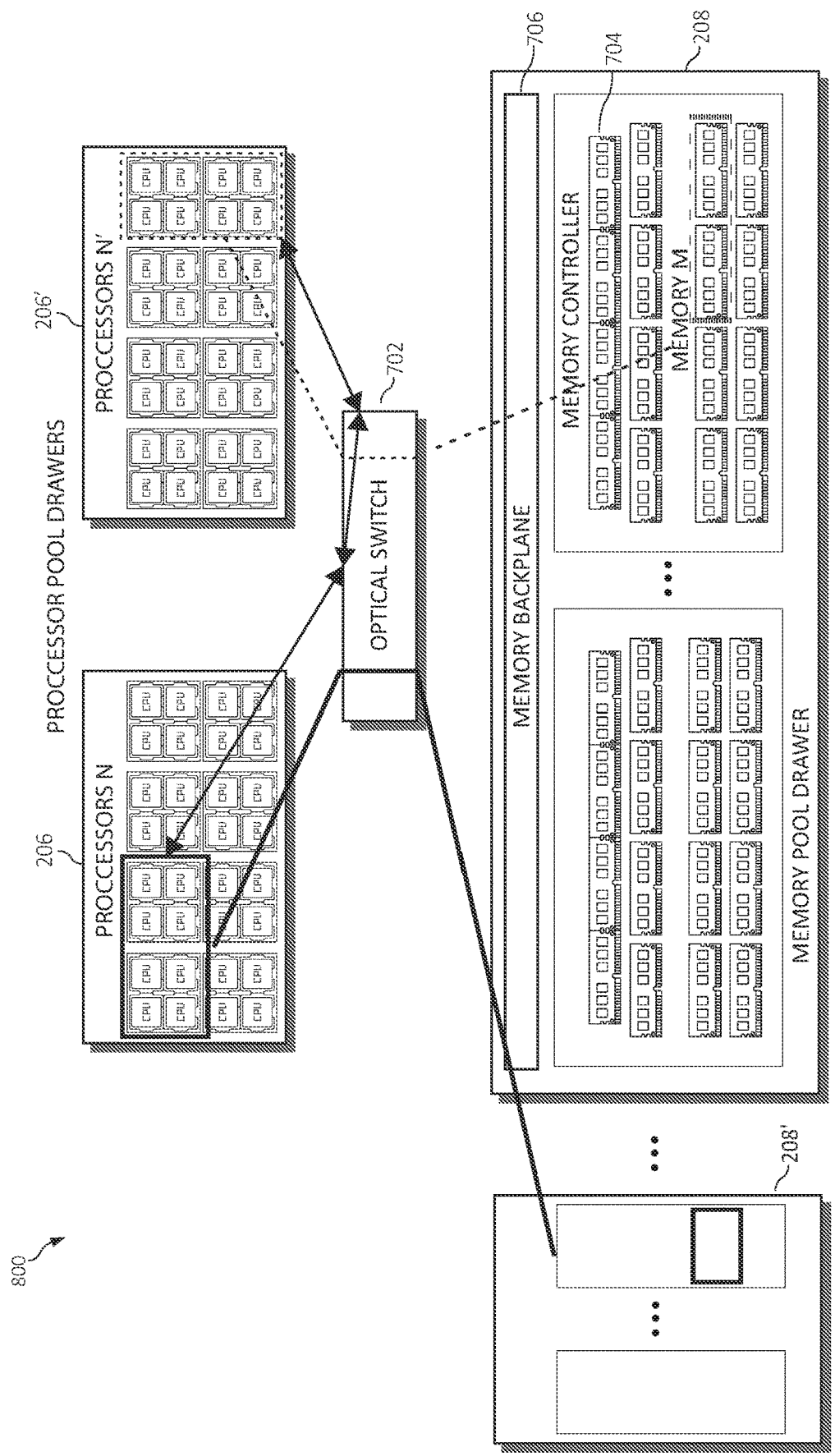
FIGS. 8A-8F are block diagrams illustrating various processor pool to memory pool communication techniques within the dynamically-wired architecture, according to aspects of the present disclosure.
Figure 8B:
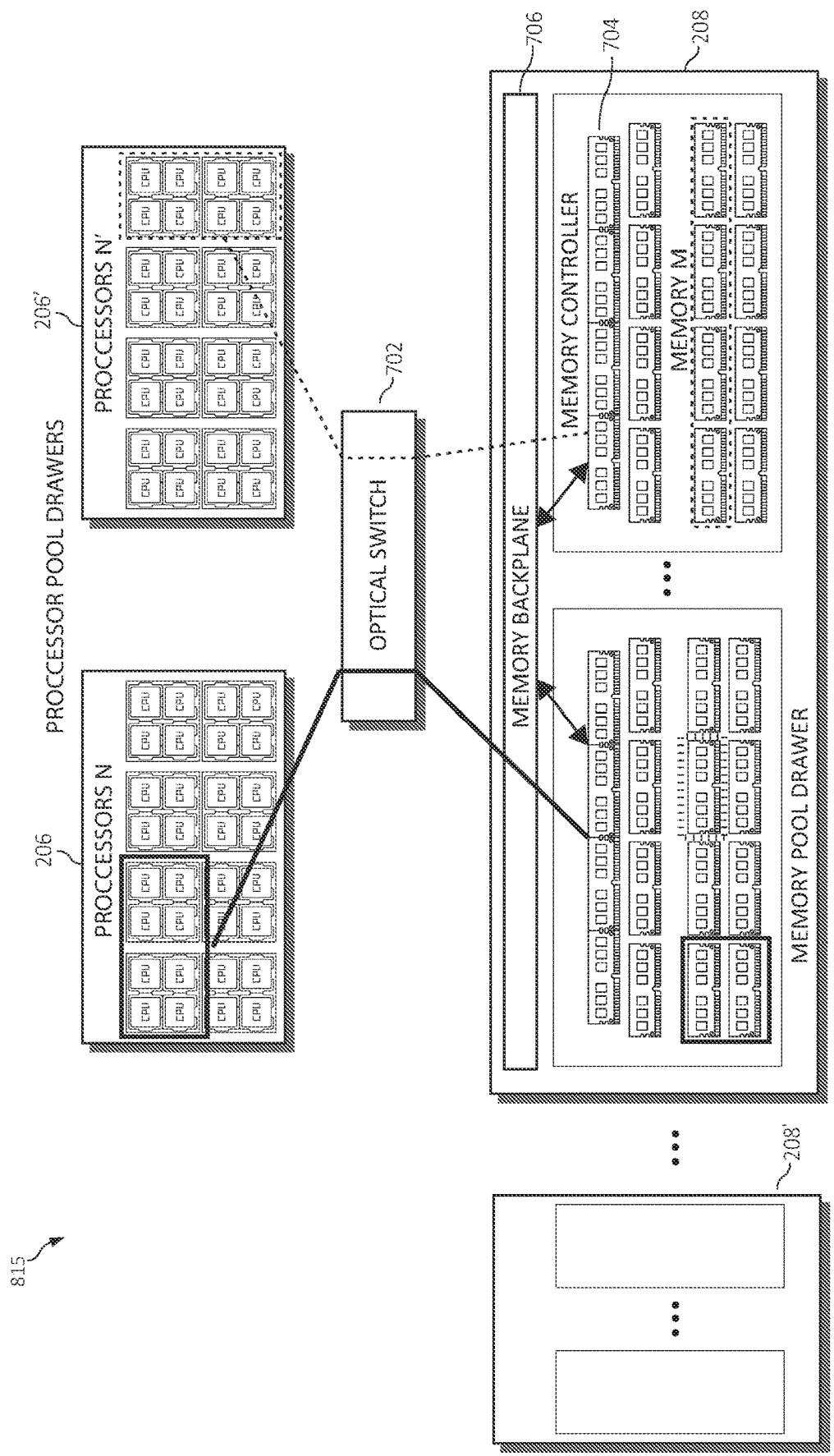
Figure 8C:
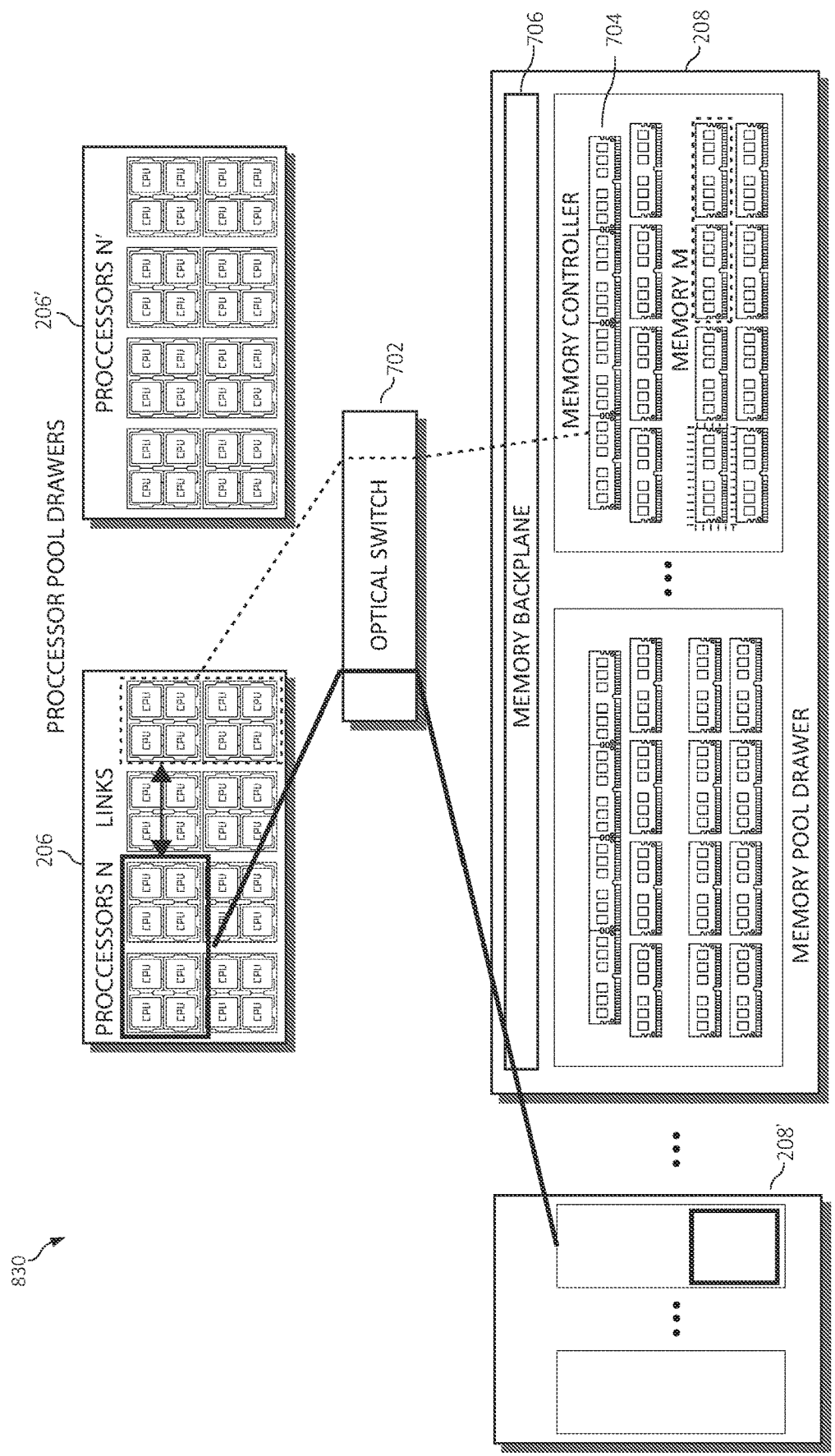
Figure 8D:
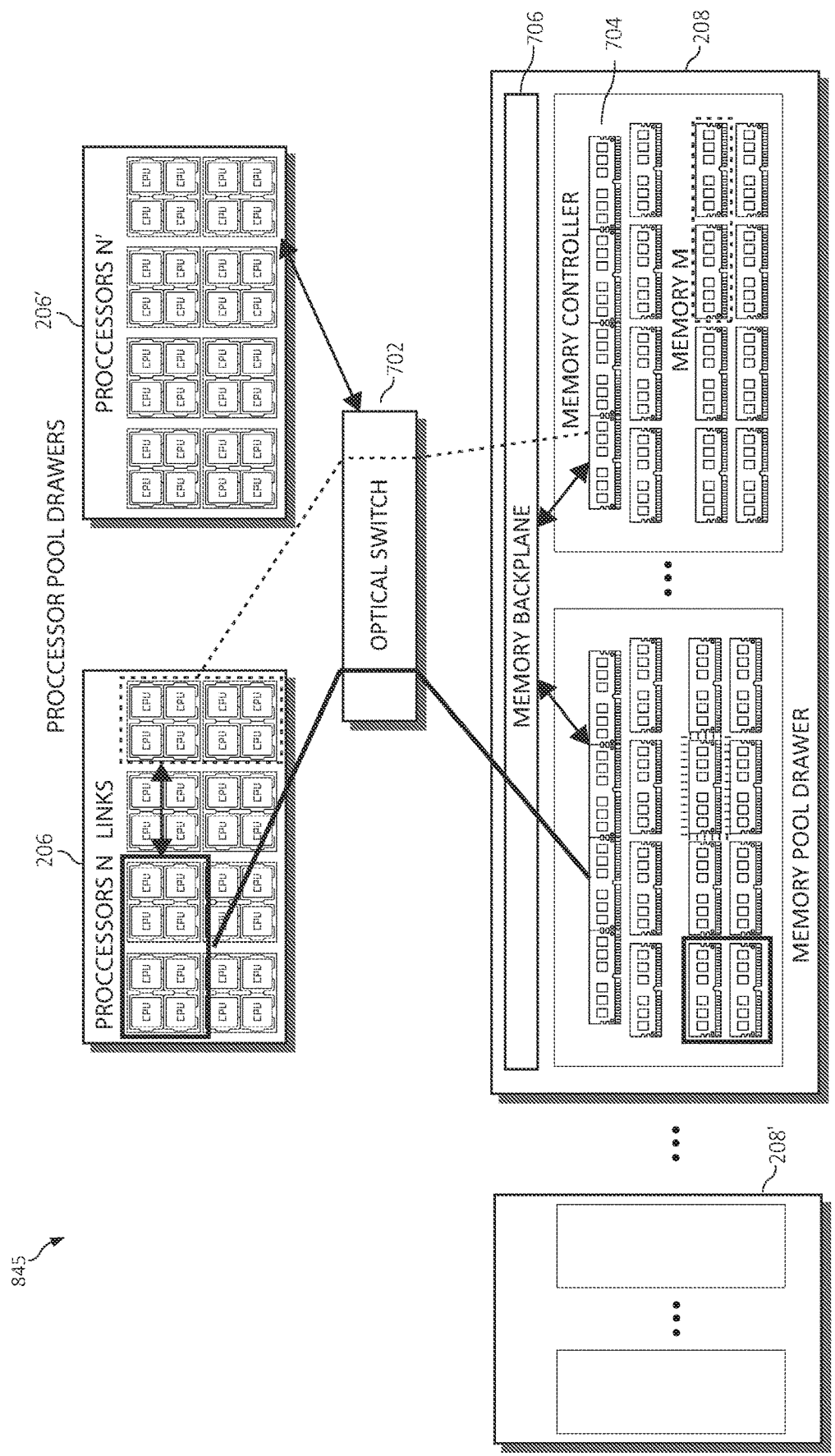
Figure 8E:
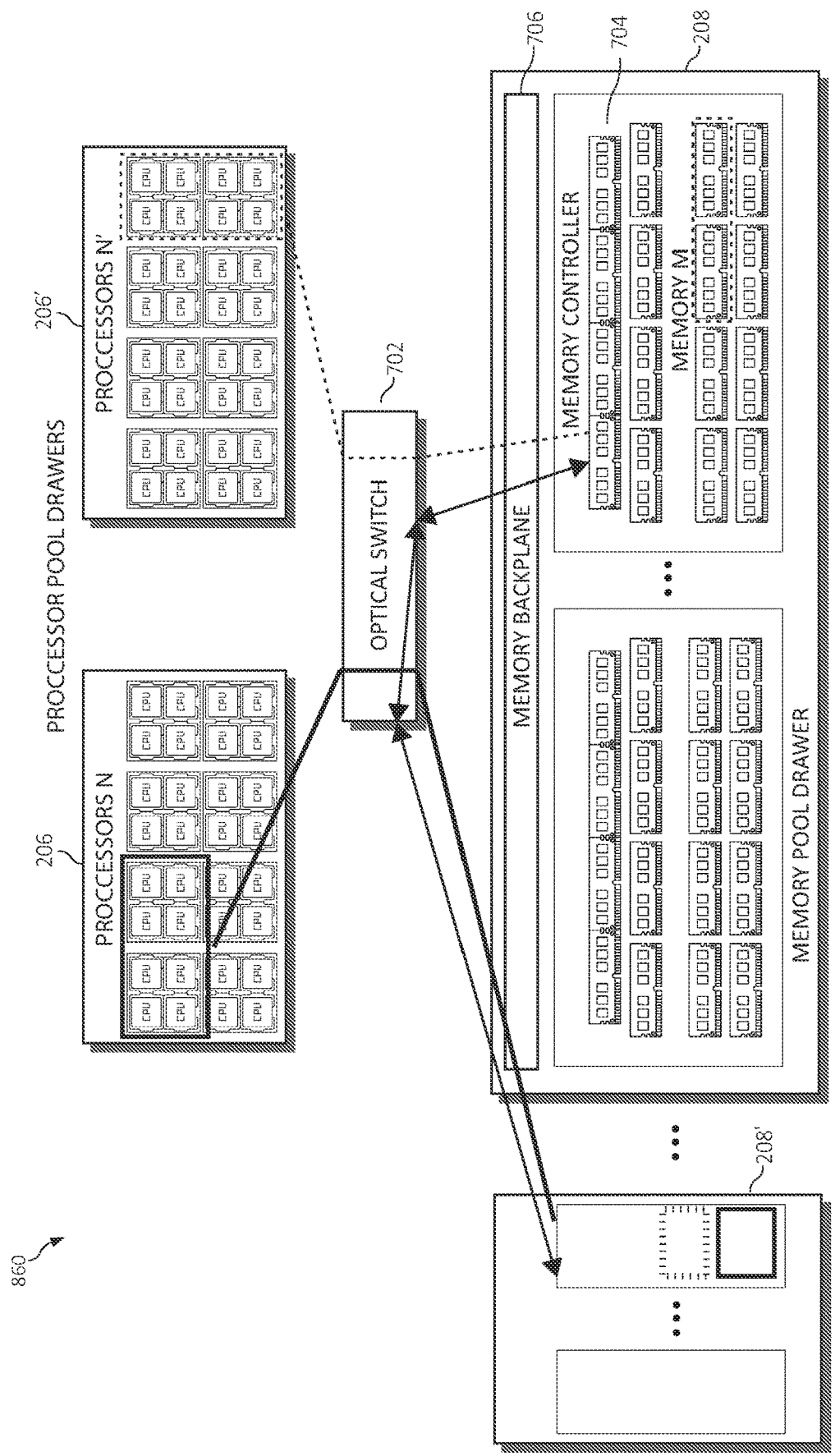

As mentioned, unlike traditional data centers where networks are wired statically, disaggregated systems support dynamically changed (switched) connections between processors and memory. FIG. 8A illustrates how communications between components/elements can benefit from the dynamic rewiring capability of the disaggregated system, which inherently separates the communication traffic from the regular network. This enables processors to read data through different memory elements without requiring that data to pass through the traditional SMP network, and thereby, in a sense, bringing differing processors which are physically further apart from one another closer to each other. In the data communication architecture 800 of FIG. 8A within the disaggregated system, consider that one or more of the processors n 206 and one or more of the processors n' 206' need to communicate and exchange data for a certain period (or are expecting to exchange certain data for a certain period). Consider also that one of or more of the processors n 206 is currently connected to another memory pool drawer (memory pool 208'). In this scenario, the system rewires the two (or more) processors to communicate through memory m within the (same) memory pool 208. This may be performed by way of forming a connection of the general purpose link of the one or more processors n 206 through the optical switch 702 to the one or more processors n' 206' through memory m. Thus, the data communication neither passes through multiple hops nor the regular network, and creates a highly efficient and low latency connection when compared to existing solutions.

In some cases, the rewiring capability may be used to move processing or memory elements closer to a workload associated with a particular SLA. That is, data objects may be monitored according to their current or past use (or a defined future use), and the disclosed rewiring mechanisms may take this information to make certain decisions about where processing and memory elements which execute this workload should be physically located. Ideally, it is advantageous to have processing elements as close as possible to the underlying data objects in which they are performing computations on. Thus, the mechanisms of the present disclosure may be used to leverage the rewiring and communication techniques disclosed herein to optimally "place" the underlying data associated with a particular workload, SLA, or tenant/user closer to the processing element which will compute such. Likewise, the disclosed communication techniques may be similarly used to advantageously determine and reconfigure those memory or storage elements/devices which the data may be distributed thereon.

As utilizing this dynamic rewiring capability can potentially increase the communication efficiency by dynamically creating processor communication groups through shared memories, it is not clear how to design such a generic communication framework leveraging the dynamic rewiring capability using current state of the art approaches. Thus, the mechanisms of the present invention generate an entirely new architecture by first establishing communication between two processing groups followed by partitioning and grouping the communications groups. FIGS. 8B-8F depict different communication establishing schemes given different combinations of locations between the processor group and the memory group.

One exemplary communication architecture may comprise a situation where two separate processor pools having one allocated memory pool communicate through the memory backplane 706. In one embodiment, as depicted in architecture 815 of FIG. 8B, when two processor groups are located on separate processor pools (processors n 206 and processors n' 206') while the allocated memory elements thereto (shown as the link in solid line) these two processor groups are within the same memory pool drawer (e.g., memory pool 208), the memory-based connection is established by allocating a memory element m (which is referenced as the memory element m in the memory pool 208 encompassed in vertical dashed lines) with the same memory pool 208 drawer of the two processor groups. In this way, the two processor groups can then communicate through memory element m by simply dynamically configuring the two links between the memory controllers 704 and the memory backplane 706, thereby enabling the two memory controllers to communicate. The links represented in horizontal dashed line and solid line between the processor groups and the memory pool 208 drawer may then be reused for other purposes.

Another exemplary scenario may comprise a situation where one processor pool having two separate memory pools allocated thereto communicates through an SMP link. Accordingly, in another embodiment, as depicted in architecture 830 in FIG. 8C, when the two processor groups are located within the same processor pool (e.g., within the processors n 206 pool/drawer) while the allocated memory elements thereto (shown as the link in solid line) are located on separate memory pool drawers (e.g., memory pool 208 and memory pool 208'), the memory-based connection is established by allocating a memory element m (which is referenced as the memory element m in the memory pool 208 encompassed in vertical dashed lines) in one of the corresponding memory pool drawers (e.g., memory pool 208). The data communication is therefore established from the processors n 206 through the optical switch 702 to the memory element m within the memory pool 208 drawer. In this way, the two processor groups may then communicate through this memory element m by simply dynamically configuring the links between the processors n 206 (shown as the "links" between the processors n 206 in horizontal dashed line and the processors n 206 in the solid line) and the link traveling through the optical switch 702 to the memory element m of the memory pool 208 drawer. This enables the processors n 206 to form SMP links to one another and to the memory element m (again, depicted in the vertical dashed lines within memory pool 208). The remaining links shown in solid line to the memory pool 208' may then be reused in this case to access the memory element m encompassed in the vertical dashed line.

Yet another exemplary scenario may comprise a situation where one processor pool having one memory pool allocated thereto communicates through SMP links or the memory backplane 706. Therefore, in another embodiment, as depicted in architecture 845 in FIG. 8D, when two processor groups are located on the same processor pool (e.g., processors 206) while the allocated memory thereto (shown as the link in solid line) is within the same memory pool drawer (e.g., memory pool 208), the memory-based communication is established by allocating a memory element m (which is referenced as the memory element m in the memory pool 208 encompassed in vertical dashed lines) within the same memory pool drawer (e.g., memory pool 208) of the two processor groups. The processors n 206 encompassed within the solid line may then access the memory encompassed in the horizontal dashed line either through the links configured at the memory backplane 706 or through the load-store links connecting the two processor groups (shown as "links" between the processor groups within processors n 206). This additional flexibility increases the link utilization and lowers any associated costs by concurrently utilizing all link bandwidth from the two processing groups to their respective memory elements.

Still another exemplary scenario may comprise a situation where two separate processor pools having memory elements within two separate memory pools communicate through shared memory optical links. Hence, in another embodiment, as depicted in architecture 860 in FIG. 8E, when two processor groups (one on each pool of processors n 206 and processors n' 206') and the allocated memory (including memory elements within memory pool 208 and memory elements within memory pool 208') thereto are located on the separate pools, the memory-based connected is established by a memory element m (which is referenced as the memory element m in the memory pool 208 encompassed in vertical dashed lines) to either memory pool drawer (i.e., memory pool 208 or memory pool 208'). A dynamic point-to-point connection may then be configured to enable the memory controller 704 of the memory element m within the memory pool 208 (encompassed in horizontal dashed line) and the additional memory controller (not shown) to additional memory element within memory pool 208' (encompassed in vertical dashed lines) to communicate. In this way the processor group within the processors n' 206' (shown in horizontal dashed line) may access the additional memory element within the memory pool 208' through the link formed between the memory controller 704 and the optical switch 702, and the optical switch 702 and the memory pool 208'.

Figure 8F:
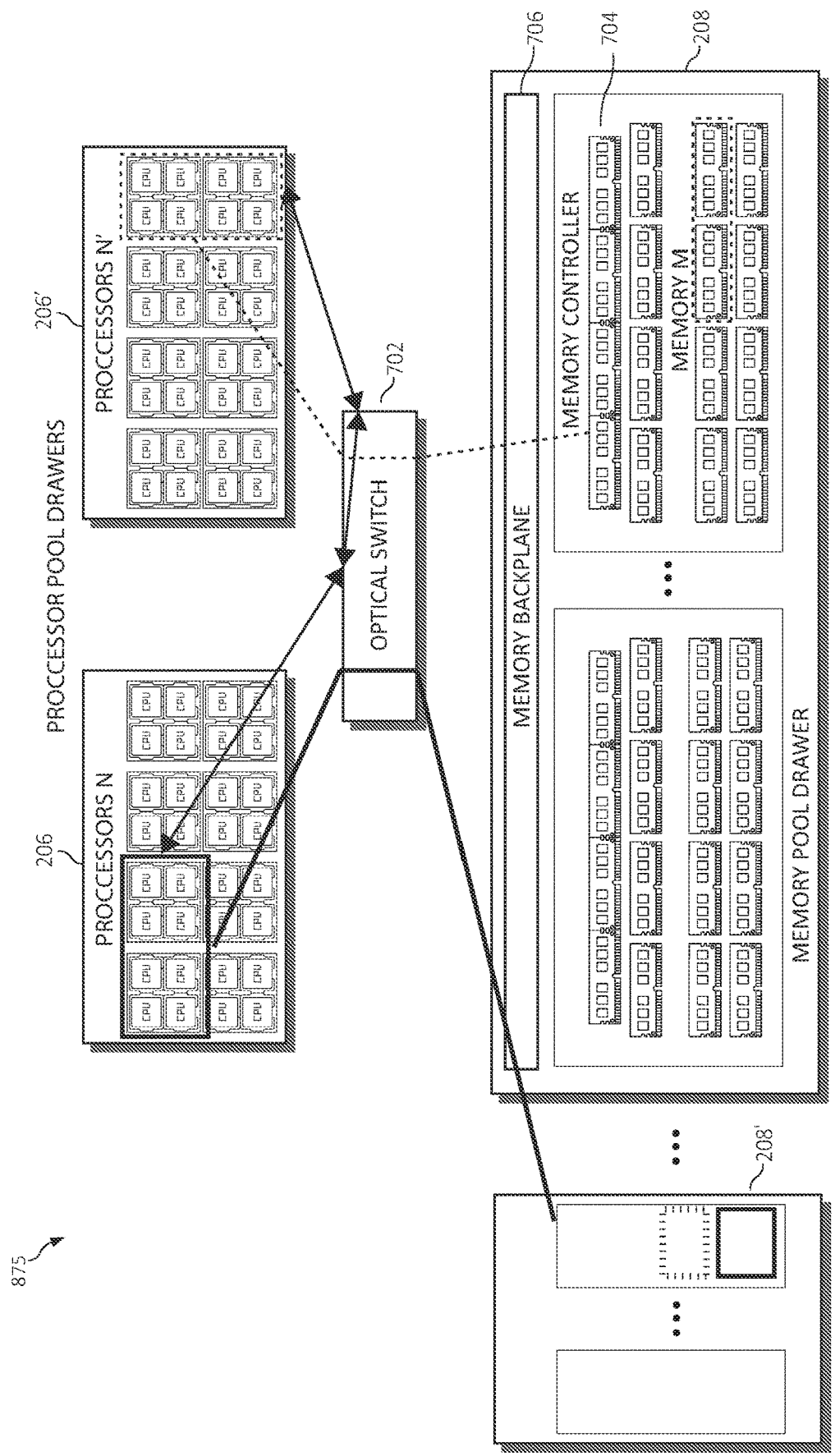

FIG. 8F illustrates yet an additional option for a scenario where two separate processor pools having memory elements within two separate memory pools communicate through processor-shared optical links. In this case, depicted in architecture 875 of FIG. 8F and similar to the architecture 860 of FIG. 8E, when both processor groups and the allocated memory thereto are located on the separate pools, the processor group within processors n' 206 (shown in horizontal dashed line) now accesses the additional memory element within the memory pool 208' (depicted in vertical dashed lines) through the link established between the processors n 206 and the processors n' 206 through the optical switch 702. These shared links through the optical switch 702 then allow either processing group of either processors n 206 (shown in solid line) or processors n' 206' (shown in horizontal dashed lines) to access the memory elements of either memory pool 208 (shown in horizontal dashed lines) or the memory elements within memory pool 208' (shown in vertical dashed lines). That is, the link formed at the optical switch 702 allows the system to choose and reroute traffic using the most efficient path. The system chooses one of the link options based on resource availability, the rewiring cost (i.e., whether the cost of the utilization of resources used to perform the reconfiguration outweighs the anticipated gain in performance) and the bandwidth utilization of the links (e.g., if one link has high bandwidth utilization, it may be advantageous to perform the reconfiguration through the alternate link).

Grouping of Communications

As mentioned in the system architecture of FIG. 4, the communication monitor 264, may monitor and detect traffic patterns of data transacted between a set of grouped servers and sends information related to these traffic patterns to the communication manager 262. The communication manager 262 may then determine whether to form a more effective network by dynamically reconnecting (rewiring) processors and memories through various links based on the detected communication pattern, as will be further described. When it is determined that a new communication network should be dynamically created, the communication manager 262 may send requests to the network grouping component 268 which determines the most effective processor grouping scheme that may be used to form a dynamic network. Subsequent to the determined processors being partitioned into groups by the network grouping component 268, the rewiring manager 266 may be assigned the task of allocating a shared memory, and processor and memory links which need to be established through the individual resource provisioning component 252 to establish the connection. The rewiring manager 266 may then instruct the management component 250 to execute the rewiring scheme. Finally, the newly established network can be used for the targeted communication to improve the communication efficiency.

The reasoning for partitioning the processors into groups are twofold. Firstly, the number of links required to be reconfigured (rewired) to establish the network may be reduced, as the processors within a given group may share the link. In this way, both the resource consumption and the time required to perform the reconfiguration may be reduced. Secondly, if the processors within each group are located within the same processor pool, these processors can communicate much more efficiently using the inter-processor links in the backplane of the processor pool. As the disaggregated system owns the ability to exchange processors between processor pools by rewiring the connections thereof without copying any data, the capability to bring grouped processors into the same processor pool can thereby be leveraged. Thus, the network grouping component 268 not only partitions processors into certain processor groups, but also exchanges processors from other groups to form the certain processor groups if necessary.

Figure 9:
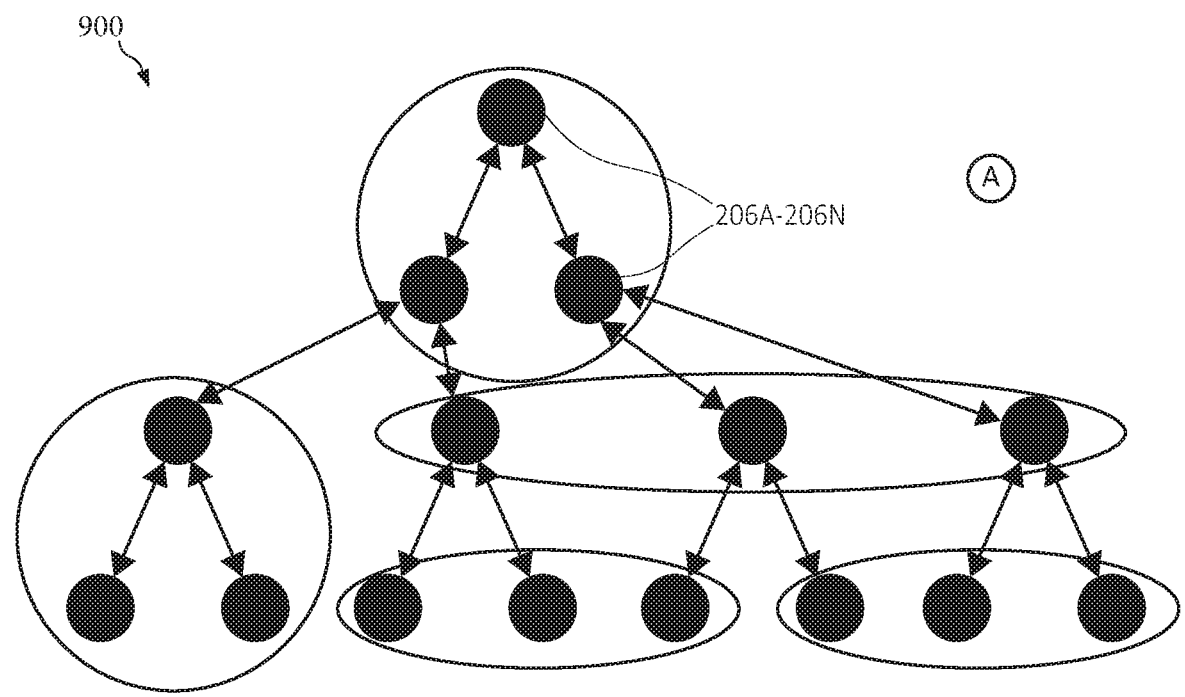
FIG. 9 is a block diagram illustrating an exemplary component grouping scheme for partitioning a communication pattern, according to aspects of the present disclosure.
Figure 9:
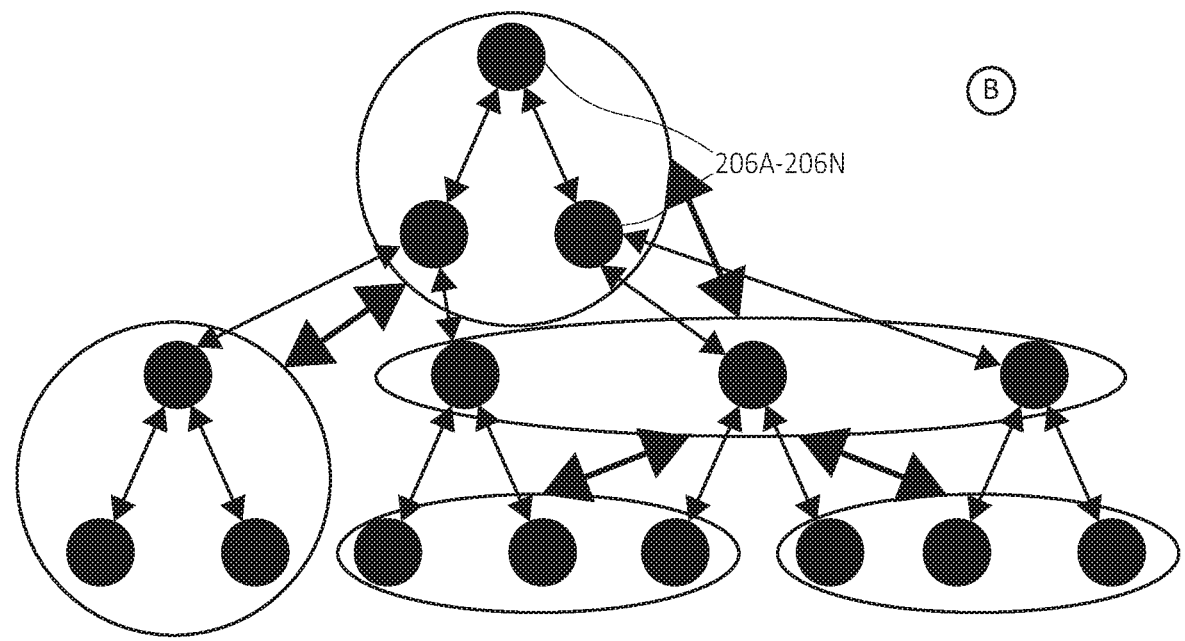

In some embodiments, the network grouping component 268 groups processors based on data traffic patterns and the location of the involved processors. In particular, the communication patterns considered include, however are not limited to, binary tree, shuffle, broadcast, and scatter and gather patterns. FIG. 9 depicts a grouping pattern 900, illustrating an example of how a binary tree communication pattern is partitioned into five groups. The grouping pattern of respective processor devices 206A-n referenced as "A" shows which of the respective processor devices 206A-n are grouped into the five established groups (circled) by the network grouping component 268. The grouping pattern referenced as "B" shows the links and the communication scheme formed between the processing groups (depicted with larger directional arrows). Subsequent to the processor devices 206A-n being grouped, the groups may then be connected using a shared memory, and therefore only one link within a processor pool needs to be reconfigured. Thus, the complexity of the reconfiguration is O(n), in which n is the number of groups.

When the processors within a group are not in the same processor pool, the rewiring manager 266 finds a destination processor pool which holds the maximum number of processors within the group, and creates exchange requests for the processor requests that are not in the same pool. For each of the exchange requests, the rewiring manager 266 identifies a processor in the targeted pool and exchanges the links between these processors and associated memory devices.

After processors are grouped as a graph, for each inter-group link, the rewiring manager 266 then proceeds to retrieve allocated memory elements from the management component 250, chooses the earlier available processor link from each processor group and reconfigures the processor to the allocated memory. Ideally, the two processor links should be reconfigured to the same memory controller if a sufficient number of links is available at the memory controller in which the allocated memory resides. Otherwise, one or both links may be rewired to the same memory drawer. If no connection is available, the system waits for t milliseconds, and otherwise fails the request.

System Application Programming Interface (API) and Process

In some embodiments, the system API may comprise the following commands: handle comm=register_communication(type, list src[ ], list dest[ ], data size) register the communication: type: broadcast, gather, shuffle, binary tree
Void deregister_communication(handle comm): de-register the communication when it is finished
Void useNetwork(comm): the following communication go through the connection of comm.
Void unuseNetwork( ): the communication go through the default connection.

Figure 10:
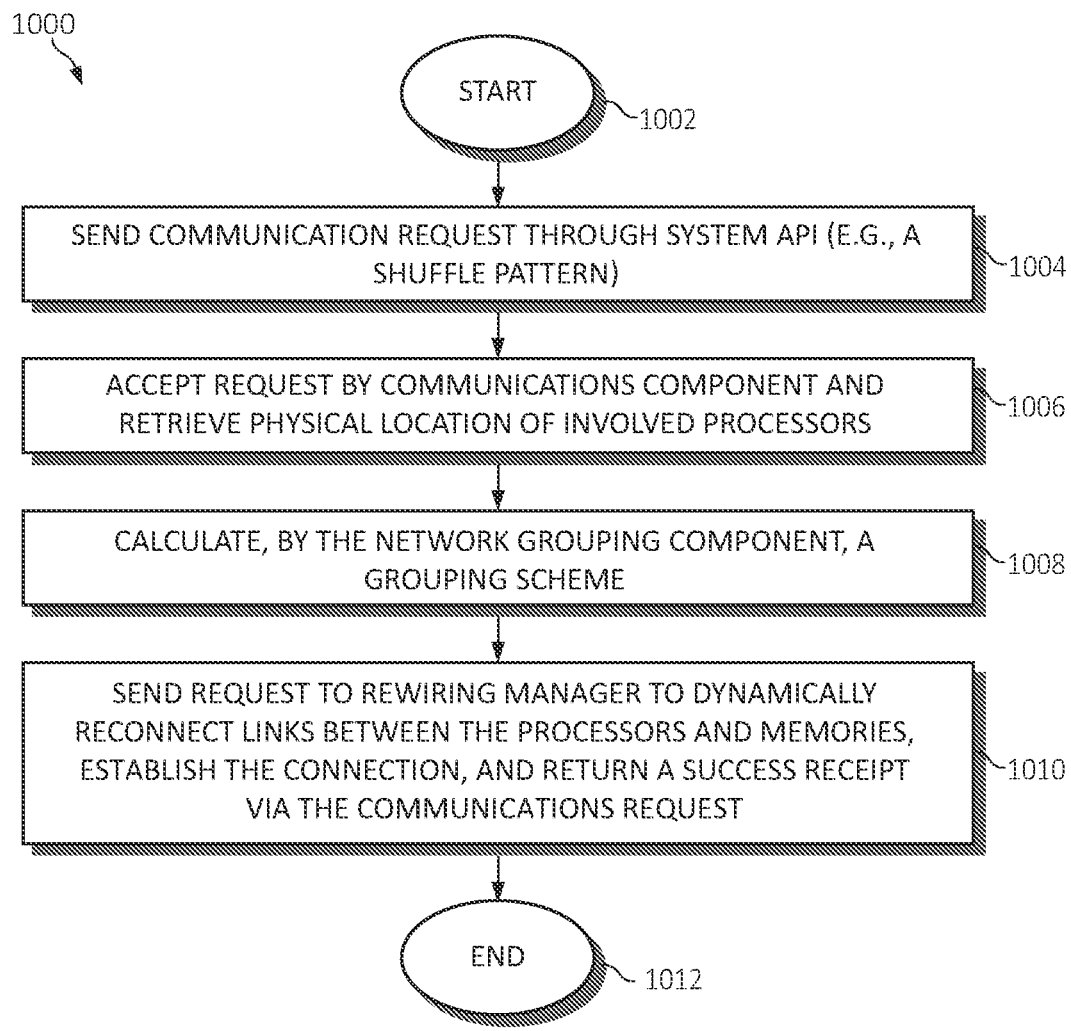
FIG. 10 is a flowchart diagram illustrating a method of a system process associated with a known communication pattern, according to aspects of the present disclosure.

According to the system API and the aforementioned system architecture, FIG. 10 is a flowchart diagram illustrating a method 1000 of a system process associated with a known communication pattern, as previously discussed. The method 1000 (and all subsequent methods disclosed herein) may be performed in accordance with the present invention in any of the environments depicted in FIGS. 1-9, among others, in various embodiments. Of course, more or fewer operations than those specifically described in FIG. 10 may be included in the methods, as would be understood by one of skill in the art upon reading the present descriptions.

Each of the steps of the method 1000 (and all subsequent methods disclosed herein) may be performed by any suitable component of the operating environment. For example, in various embodiments, the method 1000 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a CPU, an Application Specific Integrated Circuit (ASIC), a Field Programmable Gate Array (FPGA), etc., combinations thereof, or any other suitable computing device known in the art.

The method 1000 starts (step 1002) by submitting a communication request through the system API (e.g., a shuffle pattern) (step 1004). The communications manager 262 accepts the communication requests and retrieves the physical location of all involved processors (step 1006). The network grouping component 268 is then instructed to calculate a grouping scheme (step 1008). The communications request is then sent to the rewiring manager 266 which dynamically reconfigures the links between the processors and memory elements, establishes the new link connection, and returns a success receipt via the communications request (step 1010). The method 1000 ends (step 1012).

Figure 11:
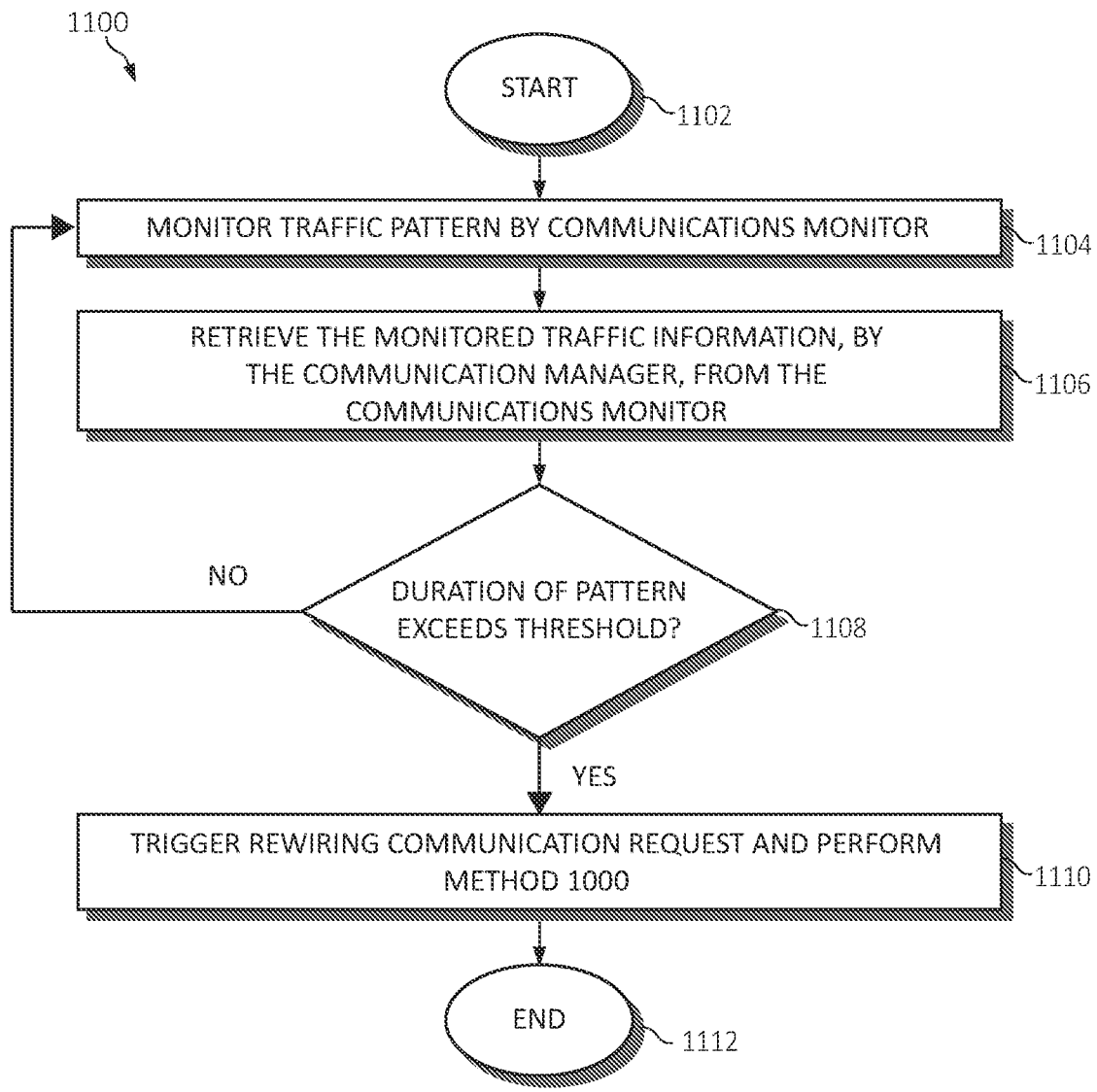
FIG. 11 is a flowchart diagram illustrating a method of a system process associated with an unknown communication pattern, according to aspects of the present disclosure.

FIG. 11 is a flowchart diagram illustrating a method 1100 of a system process associated with an unknown communication pattern, of which is determined upon monitoring. The method 1100 starts (step 1102) with monitoring, by the communications monitor 264, the traffic pattern between various processing and memory elements (step 1104). The communication manager 262 then retrieves the monitored traffic pattern information from the communications monitor 264 (step 1106). A determination is made as to whether the duration of the traffic pattern exceeds a certain threshold (step 1108). This threshold may be associated with link utilization, bandwidth, time, or a certain traffic pattern in its entirety (e.g., shuffle, etc.). If, at step 1108, the duration does not exceed the threshold, the method 1100 returns to step 1104 where the traffic pattern is monitored by the communications monitor 264. If, however, at step 1108, the duration exceeds the certain threshold, a reconfiguration (rewiring) request is triggered, and the entirety of the method 1000 is performed (step 1110). That is, the communication manager 262 accepts the triggered communication request and retrieves the physical locations of all involved processors. The network grouping component 268 is then used to calculate a grouping scheme and forward the communication request to rewiring manager 266 to dynamically reconnect the links between the respective processors and memories. Subsequent to the connection being established, the communication manager 262 returns success. The data communication thereafter is transparently switched to use the newly established network. The method 1100 ends (step 1112).

Whole-System Utilization

As mentioned, the disclosed functionality provides mechanisms to utilize every resource comprised within the datacenter. Since it is extremely important to utilize links associated with any given component wisely so as to maximize the component's output, when a link is established, it is likewise imperative to utilize its link bandwidth to the fullest possible. Hence, the described links may be aggregated for use from multiple resources of the same type to amortize the setup of these connections between resource pools. Thus for certain type of connections, such as in-memory communication (versus using read/write links to/from memory as if it was local to a computing device), the dynamically created connections may be shared between links.

Although these links may be shared, they are shared securely through encryption of a common memory location with same pairs of encryption keys (for a same service level agreement (SLA)/user). To wit, multiple links may be shared (for example between components, SLAs, and/or users) yet the data within a given link is secured by using the common memory location which is encrypted. In this way, users/tenants having a particular SLA, for example, may access the link securely just as if it were a dedicated link through use of a particular set of same encryption keys associated and known to the user/tenant or SLA.

In-Line Accelerators Vs. Block Accelerators

As further mentioned, computing elements which comprise accelerators may be used in two different ways. The first way is by connecting a first processing element with another processing element. This may be achieved, for example, through a coherent SMP type of link, in which case, the accelerator shares the main computing element visibility to memory and is to perform efficient acceleration measured by the utilization of the accelerator and the bandwidth of the link connecting it to the other computing element.

The second way is for an accelerator to have an independent local memory, copy chunks of information quickly from memory pools at the direction of the main computing element, and then signal and copy back the information to the memory when a computation is finished (as typical GPUs perform currently, for example). In this latter case, the connection is generally formed to a group of accelerators that will share the pool connections to do such data copies form memory pools, and then perform computations on the information from local memory subsequent to the copy. It should be noted, however, that, in performing this way, connections needed are used by multiple accelerators and the communication is relayed through memory pools where the computing elements have been connected previously. Thus, the group of accelerators are resources that do not need to maintain their connection to memory pools for much time, other than to retrieve the data needed for a particular workload, place it into a, local directly attached memory of the accelerator, and stream back the resulting output of the computation. Because of this situation, connections between memory elements and the multiple accelerators in the pool may be shared to maximize their utilization and allow streaming back of output to the memory. Further, the connections may be shared to allow the loading of new data to process from different accelerators that may serve different users (tenants), yet share the connections with proper security (e.g. encrypted data with different keys).

Figure 12:
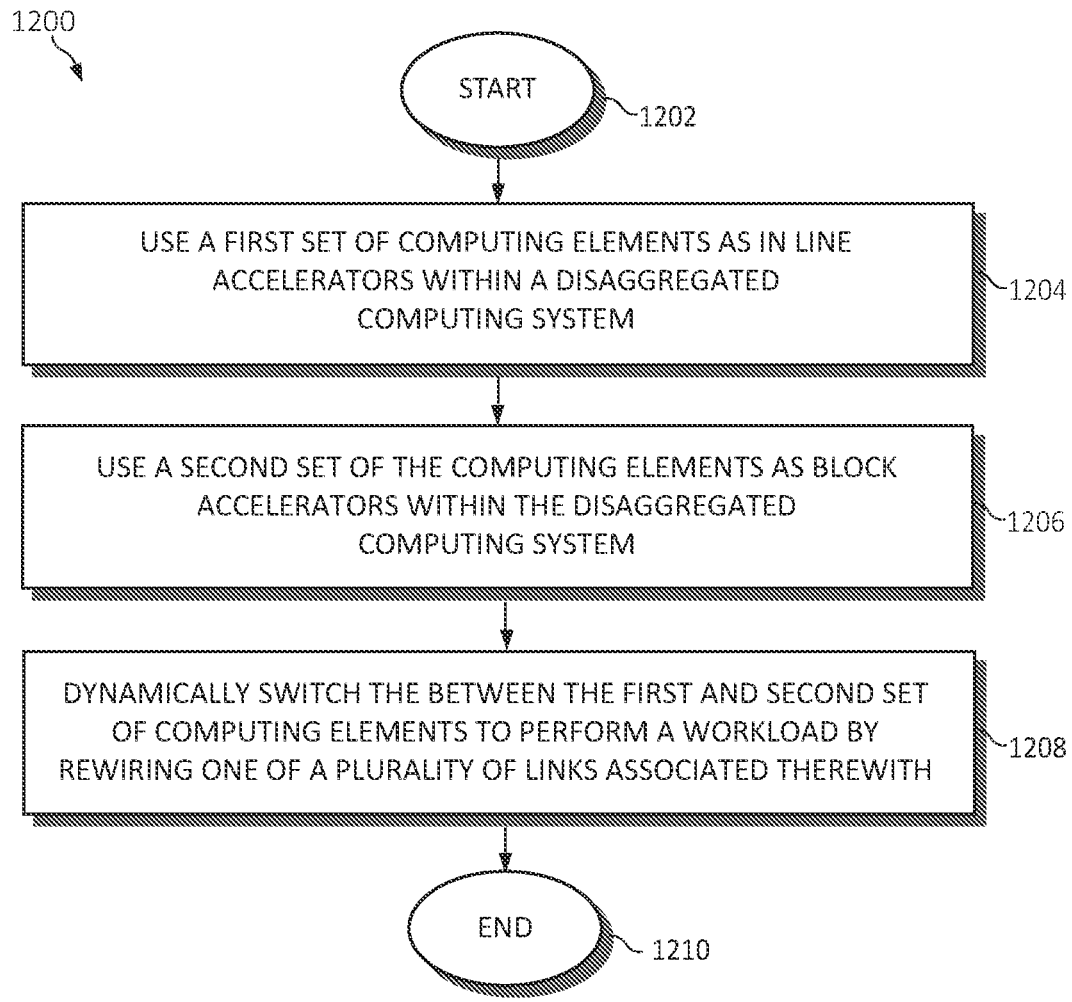
FIG. 12 is a flowchart diagram illustrating a method for efficient component communication and resource utilization in a disaggregated computing system, according to aspects of the present disclosure.

Generalizing the concepts outlined previously, FIG. 12 is a flowchart diagram illustrating a method 1200 for efficient component communication and resource utilization in the disaggregated computing system. The method 1200 starts (step 1202) by using a first set of computing elements as in line accelerators within the disaggregated computing system (step 1204) and using a second set of the computing elements as block accelerators within the disaggregated computing system (step 1206). A switching operation is performed between the first set of computing elements and the second set of computing elements to perform a workload by rewiring one of a plurality of links associated with respective ones of the first set of computing elements and the second set of computing elements (step 1208). The method 1200 ends (step 1210).

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for efficient component communication and resource utilization in a disaggregated computing system, comprising:
    providing a general purpose link to connect a plurality of computing elements in the disaggregated computing system, wherein the general purpose link connects a package of a respective computing element to a package of another respective computing element of the plurality of computing elements through a single physical connection irrespective of any predefined physical connection partitions or physical pin assignments on a physical layer of each of the packages of the computing element and the another respective computing element of the plurality of computing elements, such that one of a plurality of different hardware protocols on which the general purpose link is dynamically switched is chosen only after determining which of a plurality of hardware protocols are respectively native to the packages of which the general purpose link is currently connected;
    using a first set of computing elements of the plurality of computing elements as in-line accelerators within the disaggregated computing system, the in-line accelerators each connected to a main computing processor and sharing visibility of a memory via the main computing processor;
    using a second set of the computing elements of the plurality of computing elements as block accelerators within the disaggregated computing system, the block accelerators each having local memory and copying data from the memory to the local memory as directed by the main computing processor; and
    dynamically switching between the first set of computing elements and the second set of computing elements to perform a workload by physically rewiring one of a plurality of links, comprising the general purpose link, associated with the package of respective ones of the first set of computing elements and the second set of computing elements in real-time as the workload is performed, wherein the dynamic switching includes dynamically switching, in real-time, a respective in-line accelerator of the first set of computing elements to perform as a respective block accelerator of the second set of computing elements by circuit-switching the one of the plurality of links connected to the package of the respective in-line accelerator between the main computing processor and the local memory notwithstanding the first set of computing elements and the second set of computing elements reside with a same physical pool, and wherein the circuit-switching is performed by an optical switching device residing amongst a plurality of optical switching devices in a package switch pool such that an optical architecture incorporating the optical switching device is arranged in non-spine-leaf architecture.

2. The method of claim 1, wherein a first one of the plurality of links comprises a coherent symmetric multiprocessing (SMP) link; and respective ones of the first set of computing elements are connected to one another through the SMP link.

3. The method of claim 1, wherein a second one of the plurality of links comprises a memory link; and respective ones of the second set of computing elements are connected to the memory within a memory pool through the memory link.

4. The method of claim 1, further including sharing the local memory of a first respective one of the first set of computing elements with respective other ones of the set of computing elements.

5. The method of claim 1, wherein the switching is performed according to a measured utilization of the first and second set of computing elements and a measured bandwidth of at least one of the plurality of links.

6. The method of claim 3, further including sharing a connection between a plurality of the second set of computing elements and the memory within the memory pool through respective ones of the plurality of links.

7. The method of claim 6, further including securing the shared connection by encrypting input/output (I/O) data of the respective ones of the second set of computing elements sent through the shared connection using different encryption keys assigned to each of the respective ones of the plurality of the second set of computing elements.

8. A hardware system for efficient component communication and resource utilization in a disaggregated computing environment, comprising:
a general purpose link to connect a plurality of computing elements in the disaggregated computing system;
a first set of computing elements of the plurality of computing elements as in-line accelerators, the in-line accelerators each connected to a main computing processor and sharing visibility of a memory via the main computing processor;
a second set of the computing elements of the plurality of computing elements as block accelerators, the block accelerators each having local memory and copying data from the memory to the local memory as directed by the main computing processor; and
the main computing processor executing instructions stored in the memory; wherein the main computing processor:
connects, via the general purpose link, a package of a respective computing element to a package of another respective computing element of the plurality of computing elements through a single physical connection irrespective of any predefined physical connection partitions or physical pin assignments on a physical layer of each of the packages of the computing element and the another respective computing element of the plurality of computing elements, such that one of a plurality of different hardware protocols on which the general purpose link is dynamically switched is chosen only after determining which of a plurality of hardware protocols are respectively native to the packages of which the general purpose link is currently connected;
dynamically switches between the first set of computing elements and the second set of computing elements to perform a workload by physically rewiring one of a plurality of links, comprising the general purpose link, associated with the package of respective ones of the first set of computing elements and the second set of computing elements in real-time as the workload is performed, wherein the dynamic switching includes dynamically switching, in real-time, a respective in-line accelerator of the first set of computing elements to perform as a respective block accelerator of the second set of computing elements by circuit-switching the one of the plurality of links connected to the package of the respective in-line accelerator between the main computing processor and the local memory notwithstanding the first set of computing elements and the second set of computing elements reside with a same physical pool, and wherein the circuit-switching is performed by an optical switching device residing amongst a plurality of optical switching devices in a package switch pool such that an optical architecture incorporating the optical switching device is arranged in non-spine-leaf architecture.

9. The system of claim 8, wherein a first one of the plurality of links comprises a coherent symmetric multiprocessing (SMP) link; and respective ones of the first set of computing elements are connected to one another through the SMP link.

10. The system of claim 8, wherein a second one of the plurality of links comprises a memory link; and respective ones of the second set of computing elements are connected to the memory within a memory pool through the memory link.

11. The system of claim 8, wherein the processor enables sharing of the local memory of a first respective one of the first set of computing elements with respective other ones of the set of computing elements.

12. The system of claim 8, wherein the switching is performed according to a measured utilization of the first and second set of computing elements and a measured bandwidth of at least one of the plurality of links.

13. The system of claim 10, wherein the processor enables sharing of a connection between a plurality of the second set of computing elements and the memory within the memory pool through respective ones of the plurality of links.

14. The system of claim 13, wherein the processor secures the shared connection by encrypting input/output (I/O) data of the respective ones of the second set of computing elements sent through the shared connection using different encryption keys assigned to each of the respective ones of the plurality of the second set of computing elements.

15. A computer program product for efficient component communication and resource utilization in a disaggregated computing system, the computer program product embodied on a non-transitory computer-readable storage medium having computer-readable program code portions stored therein, the computer-readable program code portions comprising:

an executable portion that provides a general purpose link to connect a plurality of computing elements in the disaggregated computing system, wherein the general purpose link connects a package of a respective computing element to a package of another respective computing element of the plurality of computing elements through a single physical connection irrespective of any predefined physical connection partitions or physical pin assignments on a physical layer of each of the packages of the computing element and the another respective computing element of the plurality of computing elements, such that one of a plurality of different hardware protocols on which the general purpose link is dynamically switched is chosen only after determining which of a plurality of hardware protocols are respectively native to the packages of which the general purpose link is currently connected;

an executable portion that uses a first set of computing elements of the plurality of computing elements as in-line accelerators within the disaggregated computing system, the in-line accelerators each connected to a main computing processor and sharing visibility of a memory via the main computing processor;

an executable portion that uses a second set of the computing elements of the plurality of computing elements as block accelerators within the disaggregated computing system, the block accelerators each having local memory and copying data from the memory to the local memory as directed by the main computing processor; and an executable portion that dynamically switches between the first set of computing elements and the second set of computing elements to perform a workload by physically rewiring one of a plurality of links, comprising the general purpose link, associated with the package of respective ones of the first set of computing elements and the second set of computing elements in real-time as the workload is performed, wherein the dynamic switching includes dynamically switching, in real-time, a respective in-line accelerator of the first set of computing elements to perform as a respective block accelerator of the second set of computing elements by circuit-switching the one of the plurality of links connected to the package of the respective in-line accelerator between the main computing processor and the local memory notwithstanding the first set of computing elements and the second set of computing elements reside with a same physical pool, and wherein the circuit-switching is performed by an optical switching device residing amongst a plurality of optical switching devices in a package switch pool such that an optical architecture incorporating the optical switching device is arranged in non-spine-leaf architecture.

16. The computer program product of claim 15, wherein a first one of the plurality of links comprises a coherent symmetric multiprocessing (SMP) link; and respective ones of the first set of computing elements are connected to one another through the SMP link.

17. The computer program product of claim 15, wherein a second one of the plurality of links comprises a memory link; and respective ones of the second set of computing elements are connected to the memory within a memory pool through the memory link.

18. The computer program product of claim 15, further including an executable portion that enables sharing the local memory of a first respective one of the first set of computing elements with respective other ones of the set of computing elements.

19. The computer program product of claim 15, wherein the switching is performed according to a measured utilization of the first and second set of computing elements and a measured bandwidth of at least one of the plurality of links.

20. The computer program product of claim 17, further including an executable portion that enables sharing of a connection between a plurality of the second set of computing elements and the memory within the memory pool through respective ones of the plurality of links.

21. The computer program product of claim 20, further including an executable portion that secures the shared connection by encrypting input/output (I/O) data of the respective ones of the second set of computing elements sent through the shared connection using different encryption keys assigned to each of the respective ones of the plurality of the second set of computing elements.

\* \* \* \* \*